United States Patent
Chow et al.

(10) Patent No.: US 10,819,613 B2
(45) Date of Patent: Oct. 27, 2020

(54) SYSTEM AND METHOD FOR INTERACTING WITH AND CONTROLLING TESTING OF WIRELESS DEVICE AND/OR WIRELESS NETWORK PERFORMANCE ON WIRELESS ELECTRONIC DEVICES

(71) Applicant: Tutela Technologies Ltd., Victoria (CA)

(72) Inventors: Brennen Stephen Chow, Port Coquitlam (CA); Hunter Banford Bulmer MacDonald, Keswick Ridge (CA); David Daniel Yarish, Victoria (CA); Anthony Sean Kroeker, Victoria (CA); Stephen William Neville, Victoria (CA); Thomas E. Darcie, Victoria (CA)

(73) Assignee: Tutela Technologies Ltd., Victoria (CA)

( * ) Notice: Subject to any disclaimer, the term of this patent is extended or adjusted under 35 U.S.C. 154(b) by 176 days.

(21) Appl. No.: 15/872,166

(22) Filed: Jan. 16, 2018

(65) Prior Publication Data
US 2018/0205631 A1    Jul. 19, 2018

Related U.S. Application Data

(60) Provisional application No. 62/447,220, filed on Jan. 17, 2017.

(51) Int. Cl.
*H04L 12/26* (2006.01)
*H04W 24/08* (2009.01)
(Continued)

(52) U.S. Cl.
CPC .......... *H04L 43/50* (2013.01); *H04L 41/5009* (2013.01); *H04L 43/0876* (2013.01);
(Continued)

(58) Field of Classification Search
CPC ..................................................... H04L 43/50
See application file for complete search history.

(56) References Cited

U.S. PATENT DOCUMENTS

| 8,355,945 B1 | 1/2013 | Lall et al. |
| 9,274,935 B1 | 3/2016 | Lachwani et al. |

(Continued)

FOREIGN PATENT DOCUMENTS

| CA | 2420238 C | 5/2011 |
| CA | 2662415 C | 9/2012 |

(Continued)

OTHER PUBLICATIONS

Ott, M.; International Search Report from corresponding PCT Application No. PCT/CA2018/050041; search completed Apr. 16, 2018.

(Continued)

*Primary Examiner* — Ayanah S George
(74) *Attorney, Agent, or Firm* — CPST Intellectual Property Inc.; Brett J. Slaney

(57) ABSTRACT

There is provided a method of controlling behaviour of a system that evaluates wireless device performance, and/or wireless network performance, and/or wireless network usage trends. The method comprises providing wireless device software to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with characteristics and/or location of the device, and/or performance of the device and/or the network, and/or usage of the device by a user; receiving via one or more collection servers, test data obtained by the wireless device software of each of the (Continued)

plurality of wireless electronic devices; providing a data set to a third party, the data set comprising at least some of the test data; and enabling a configuration server in communication with the wireless device software to be controlled to modify the testing behaviour of the wireless device software based at least in part on the data set provided to the third party.

24 Claims, 11 Drawing Sheets

(51) Int. Cl.
*H04L 12/24* (2006.01)
*H04W 12/08* (2009.01)
*H04W 24/10* (2009.01)
*H04W 12/12* (2009.01)

(52) U.S. Cl.
CPC ........... *H04W 12/08* (2013.01); *H04W 24/10* (2013.01); *H04L 43/08* (2013.01); *H04W 12/1208* (2019.01)

(56) References Cited

U.S. PATENT DOCUMENTS

| | | | |
|---|---|---|---|
| 9,430,364 | B1 | 8/2016 | Ryan et al. |
| 9,444,692 | B2 | 9/2016 | Lehane et al. |
| 9,451,451 | B2 | 9/2016 | Chow et al. |
| 9,530,168 | B2 | 12/2016 | Ahn et al. |
| 2006/0224730 | A1 | 10/2006 | Fok et al. |
| 2008/0239972 | A1 | 10/2008 | Omar |
| 2008/0274716 | A1* | 11/2008 | Fok .................. H04W 12/08 455/410 |
| 2011/0106942 | A1 | 5/2011 | Roskowski et al. |
| 2011/0161484 | A1 | 6/2011 | Van Den Bogaert et al. |
| 2015/0371163 | A1 | 12/2015 | Noh et al. |
| 2016/0100325 | A1 | 4/2016 | Hain |
| 2016/0255482 | A1 | 9/2016 | Brown et al. |
| 2016/0353314 | A1 | 12/2016 | Chow et al. |
| 2017/0171770 | A1 | 6/2017 | Wennesheimer et al. |
| 2017/0220933 | A1 | 8/2017 | Gonguet et al. |
| 2017/0286679 | A1* | 10/2017 | Khare .................. G06F 9/445 |

FOREIGN PATENT DOCUMENTS

| | | | | |
|---|---|---|---|---|
| EP | 2733614 A2 | 5/2014 | | |
| WO | WO-2008042813 A2 * | 4/2008 | ........... | G06F 9/5011 |
| WO | 2010/019452 A2 | 2/2010 | | |
| WO | 2014/165631 A1 | 10/2014 | | |

OTHER PUBLICATIONS

Supplemental European Search Report issued in corresponding EP application No. 18741647; dated Jul. 20, 2020.

* cited by examiner

SYSTEM AND METHOD FOR INTERACTING WITH AND CONTROLLING TESTING OF WIRELESS DEVICE AND/OR WIRELESS NETWORK PERFORMANCE ON WIRELESS ELECTRONIC DEVICES

CROSS-REFERENCE TO RELATED APPLICATION(S)

This application claims priority to U.S. Provisional Patent Application No. 62/447,220 filed on Jan. 17, 2017, the contents of which are incorporated herein by reference.

TECHNICAL FIELD

The following relates to systems and methods for interacting with and controlling testing of wireless device and/or wireless network performance on wireless electronic devices.

DESCRIPTION OF THE RELATED ART

The number of wireless devices that are accessing wireless communication networks is continually growing. These devices may access the various networks via cellular, WiFi and other access points. As the number of devices grows, the strain on these networks grows, affecting the performance of both the networks and the devices.

In order to address the performance of wireless devices and wireless networks, network service providers, device manufacturers, application developers and other entities that have a stake in affecting such performance require performance and usage data. Various techniques exist for collecting and evaluating performance and usage data, for example, standalone on-device applications or modules that perform periodic testing. Wireless carriers may also have native applications that have access to certain performance data that can be evaluated. However, these techniques can be either intrusive to the devices and users of those devices, or be limited to the type of network and/or type of device and/or type of user onto which the applications or modules are deployed.

These techniques are also typically limited in their ability to be modified and to interact with the devices onto which they are deployed.

SUMMARY

The following provides a system and method that makes crowdsourced data gathered from a multitude of wireless electronic devices available to application developers and/or other third parties such as network operators or device manufacturers to improve application, device and/or network performance. By embedding software in these devices or otherwise deploying the software on the respective devices, and taking advantage of such deployment across a varied number of users on different device types operating in different networks and network types, a vast amount of data is available for informing developers and operators. In particular, the data that is collected informs on how an application and/or network is performing in different scenarios to allow developers and networks to adjust accordingly, even in real-time.

The systems and methods described herein not only enable testing behaviours to be controlled, the data obtained via the testing can enable app developers and other third parties (e.g., network operators) to having testing controlled and/or to adjust or update their application code based on the collected data. This allows existing channels such as updates via an application store to update the applications accordingly. The system's interface with the devices can also provide an additional interface or channel to communicate with and interact with applications directly. Moreover, the software deployed within the wireless environment can be used to control how tests are performed and to control how the app performs when entering different network environments and/or different operating conditions.

In one aspect, there is provided a method of controlling behaviour of a system that evaluates wireless device performance, and/or wireless network performance, and/or wireless network usage trends. The method comprises providing wireless device software to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with characteristics and/or location of the device, and/or performance of the device and/or the network, and/or usage of the device by a user; receiving via one or more collection servers, test data obtained by the wireless device software of each of the plurality of wireless electronic devices; providing a data set to a third party, the data set comprising at least some of the test data; and enabling a configuration server in communication with the wireless device software to be controlled to modify the testing behaviour of the wireless device software based at least in part on the data set provided to the third party.

In another aspect, there is provided a method of interacting with an application by a third party, the method comprising: receiving a data set from a system that evaluates wireless device and/or wireless network performance and/or network usage trends, the data set comprising test data associated with a first application, the test data having been obtained by the wireless device software of each of the plurality of wireless electronic devices, the wireless device software having been provided to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with performance of the device and/or the network and/or usage of the device by a user; analyzing the data set to determine at least one operation to add or modify in the application or for controlling testing behaviour for the first application; and having the at least one operation applied.

In other aspects there are systems and computer readable medium configured or operable to perform the methods.

BRIEF DESCRIPTION OF THE DRAWINGS

Embodiments will now be described by way of example with reference to the appended drawings wherein.

DETAILED DESCRIPTION

The following provides a system that enables crowd-sourced data from a multitude of devices to be leveraged, by providing the data back to application developers and/or network operators or device manufacturers, in order to adjust testing behaviours, application operability, device, or network operability, or configurations based on what can be determined from the data. A channel can also be established between application developers and other third parties and the applications (and devices themselves), via the system described herein, to provide an additional feedback loop that can be used to deliver updates, perform debugging, and/or modify test behaviour and other functionality of an application.

Figure 1:
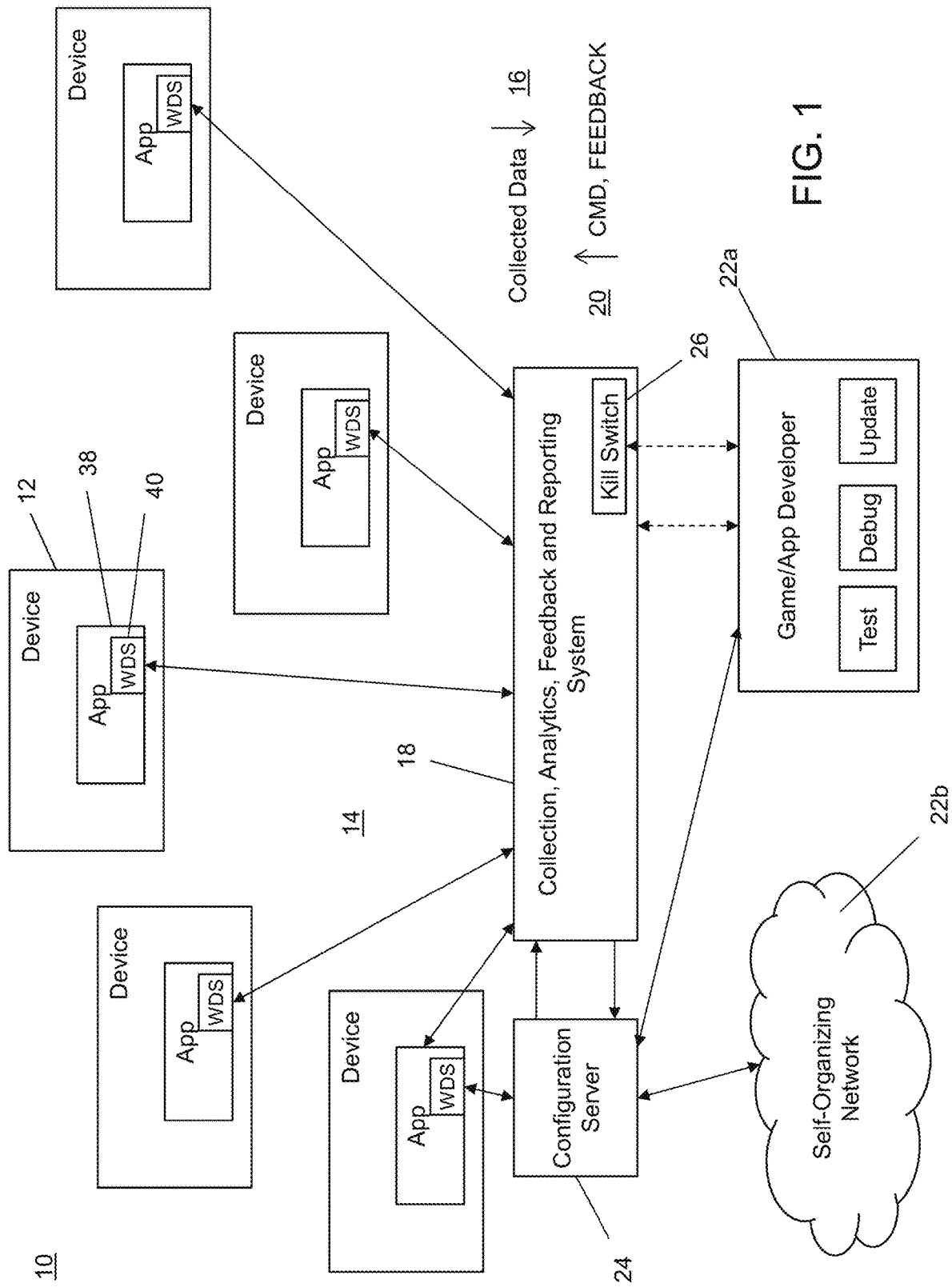
FIG. 1 is a schematic block diagram of a wireless communication environment that includes a number of electronic communication devices.

Turning now to the figures, FIG. 1 illustrates an example of a wireless environment 10 which can include one or more wireless networks 14. The networks 14 can be of different types, e.g., different cellular network types (2G, 3G, 4G, etc.). The different network types can also include other types of wireless networks 14 such as WiFi networks accessible through available WiFi access points. Within the wireless network environment 10 various electronic communication devices 12 having wireless capabilities operate by connecting to one or more of the different networks/network types 14 and/or directly with each other over peer-to-peer or mesh-type connections.

In order to obtain crowdsourced data 16 from the environment 10, each of the devices 12 includes a software functionality that is capable of performing tests, monitoring existing device operations and usage, and otherwise collecting data on or related to one or more applications on that device 12. This software functionality is referred to herein as wireless device software (WDS) 40, and in the example shown in FIG. 1, the WDS 40 is embedded in at least one app 38 on the devices 12. However, as will be illustrated below, the WDS 40 can be deployed on the devices 12 in different configurations than that shown in FIG. 1. By partnering with publishers of various mobile apps (e.g., games), the WDS 40 can be distributed to millions of mobile devices 12 to anonymously collect QoS, device and app usage data, among other things. It can be appreciated that the WDS 40 can also be integrated with carrier apps or other purpose-built apps to be used on a number of mobile devices 12. The WDS 40 can be embedded in apps and games running on various mobile platforms/OS such as Android, iOS, Windows, etc.; as well as other mobile platforms such as those used for wearables, gaming, vehicle systems, wireless sensors, etc. That is, any other device/platform with location-tracking capabilities (e.g., GPS, network based location, etc.) and network (e.g., Internet) connectivity with an ability to run the software functionality described herein are applicable to the data collection, analysis, and feedback/reporting mechanisms described herein. In some implementations, devices with only network connectivity and without location-based capabilities may also be incorporated into the system.

The data 16 that is collected is preferably tied to a location or otherwise considered "location-based" such that the data 16 or information derived from the data 16 can be placed on a map. The data 16 is also preferably collected in an anonymous manner such that no personally identifiable information is collected and/or stored by the system 18. For example, the system 18 should be configured to not collect a device's advertiser ID, device ID, or other information that could be used in conjunction with another dataset to identify the user of the device 12. In one implementation, the software functionality described herein can be configured to generate and append a unique random number which is specific to the particular installation, and which is reset (e.g. regenerated) periodically (e.g., each day). This can be done to ensure that an adversary cannot observe data reported from one device over the course of several days to determine who that device may belong to.

The data 16 can include, without limitation: device location, device manufacturer name, device model, OS name and version, network operator ID, % memory free, CPU utilization, battery drain rate, storage utilization (i.e. device metrics), application name, download bytes, upload bytes, first install time, last updated time (i.e. mobile application metrics), upload throughput, download throughput, latency, link speed, signal strength, jitter, packet discard rate, packet loss, # of radio frequency conflicts (i.e. network QoS metrics), BSSID, SSID, signal strength (i.e. Wi-Fi scan metrics), connection start/end times, connection type, technology, service provider, cell ID, LAC, MCC, MNC, DHCP response time (i.e. connection metrics), etc.

The collected data 16 is fed to a central system 18 that includes modules and processes for collecting the data 16, processing and analyzing the data 16, generating feedback for the WDS 40 and devices 12, and preparing user interfaces and reports therefore. It can be appreciated that multiple "central" systems 18 can be used, e.g., to comply with handling laws requiring that data from a particular jurisdiction be stored in that jurisdiction, etc. The data 16 can be securely stored in cloud-based databases and securely transmitted via secure connections (e.g., HTTPS). The databases can be globally dispersed and can be configured to provide direct access to the clients of the system 18.

The reports and user interfaces are generated and made available to one or more third parties 22, in particular to game or app developers 22a (as illustrated), or network operators, e.g., for a self-organizing network (SON) 22b as shown by way of example. The reports and user interfaces can be provided using data visualization tools such as graphical reports, interactive dashboards, web tools, etc. Reports can be delivered on a periodic basis or in real time with dashboards being available when needed online at any time.

In addition to reporting to third parties 22, the data 16 can be exposed to a game or app developer 22a to improve their services, application performance, conduct debugging, adjust how testing using the WDS 40 affects the app, determine updates to be applied, etc.

For example, if it is known from millions of devices, that network performance is likely to be poor in a specific time/location then the application 38 would know ahead of time to not perform network intensive actions at that time/location. It may be that an application 38 chooses not to prompt the user for in-app purchases when it is known that the network 14 is not good enough to process credit card payments. Or it may be that the application 38 chooses to only show picture advertisements and not video advertisements when the network is known to be poor, based on data stitched across multiple apps/devices/networks. Application developers may also choose to design their applications 38 to perform better in the network quality environment that the application 38 will be entering. This can be done by including logic in the application 38 that coordinates with the WDS 40 to determine certain performance parameters such as location, timing, etc. That is, while the WDS 40 primarily gathers data concerning the device and network usage, it can be leveraged to improve application performance. As shown in FIG. 1, commands or other feedback 20 can be sent by the system 18 to the WDS 40 in the devices 12, e.g., to affect the behaviour of the WDS 40 and/or the applications 38 themselves.

As shown in FIG. 1, other third parties 22 such as SONs 22b can also benefit from the data 16 that is crowdsourced by the system 18. SONs 22b dynamically adjust the network, antennae, or wave forming characteristics in response to network quality. The idea is that the network is self-healing such that if there is an issue, the network will adjust to eliminate the issue all on its own. SONs typically require access to large amounts of field data to operate, which can be satisfied with the large datasets that can be obtained using the system 18.

The system 18 can have or otherwise control or operate with a configuration server 24 that generally represents any entity or service that can be controlled by or through the system 18 for interacting with the WDS 40 deployed on the devices 12. In this way, the behaviour of the WDS 40 or the effects on and/or behaviour of the applications 38 can be modified by the system 18 or even the third parties 22 directly, if registered or otherwise permitted to by the system 18. It can be appreciated that, as illustrated below, the configuration server 24 can also act in the normal operation of the system 18 and WDS 40 to determine what testing to perform and when, for collecting the data 16. That is, the configuration server 24 can be leveraged by the third parties 22, through the system 18 (or directly), to create a two-way channel with their apps 38. In the same way, device manufacturers can leverage the configuration server 24 to modify operation of the devices 12, and/or network operators can use the data 16 collected by the WDS 40 in or separately from their own network-specific apps 38 to modify the behaviour of devices 12 in their own networks, or to integrate other systems such as a SON 22b. Accordingly, the deployment of the WDS 40 and its interface with the system 18, in addition to the system's ability to control operation of the WDS 40 and provide a channel into apps 38 distributed among millions of devices 12, enables the system 18 to be leveraged by the third parties 22 interested in the data 16.

Also shown in FIG. 1 for illustrative purposes is a kill switch module 26 in the system 18, that provides an ability for third party game/app developers 22a to not only control operation of their apps 38 and/or testing from within those apps 38, the system 18 can be further leveraged to terminate the connections between the system 18 and certain apps 38, e.g., in the case of a security breach or to avoid a potential app or server failure. It can be appreciated that the kill switch module 26 can also be integrated into the configuration server 24 and/or the app 38 or WDS 40.

Figure 2A:
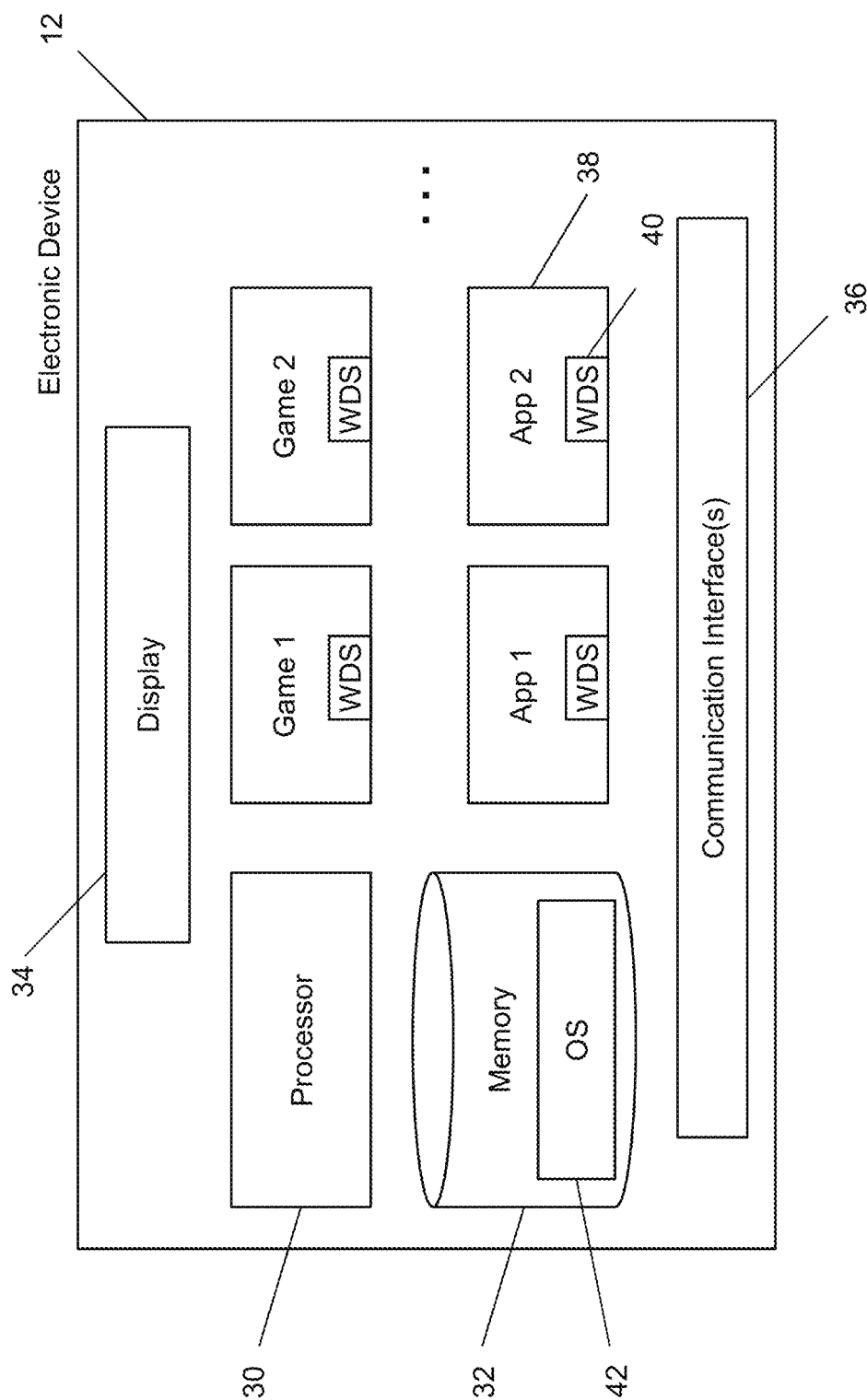
FIG. 2A is a block diagram of a configuration for a wireless device.

Turning now to FIG. 2A, an example of a configuration for an electronic device 12 is shown having at least one instance of the WDS 40. The device 12 includes a processor 30, memory 32, and an operating system 42. The device 12 is also operable in this example to provide graphical user interfaces to a user via a display 34. For example, a visual component can be provided directly on the device 12 for displaying a portion of the information collected to the user, if desired by the user. The device 12 also includes one or more communication interfaces 36 that are operable to connect the device 12 to one or more networks 14. As also shown in FIG. 2A, the device 12 can include multiple apps 38, of different types as discussed above. In order to collect and send data 16 which is relevant across multiple apps 38 and app types, each app 38 embeds the aforementioned WDS 40 (that is embedded in, and runs in the background of the app 38) to gather particular data, perform tests, etc. The WDS 40 is capable of not only accessing components on the device 12 such as the processor 30, battery (not shown) and OS 42, the WDS 40 can be configured to either directly, or via the app 38 on which it resides, communicate on one or more networks 14 by interfacing with the one or more communication interfaces 36.

Figure 2B:
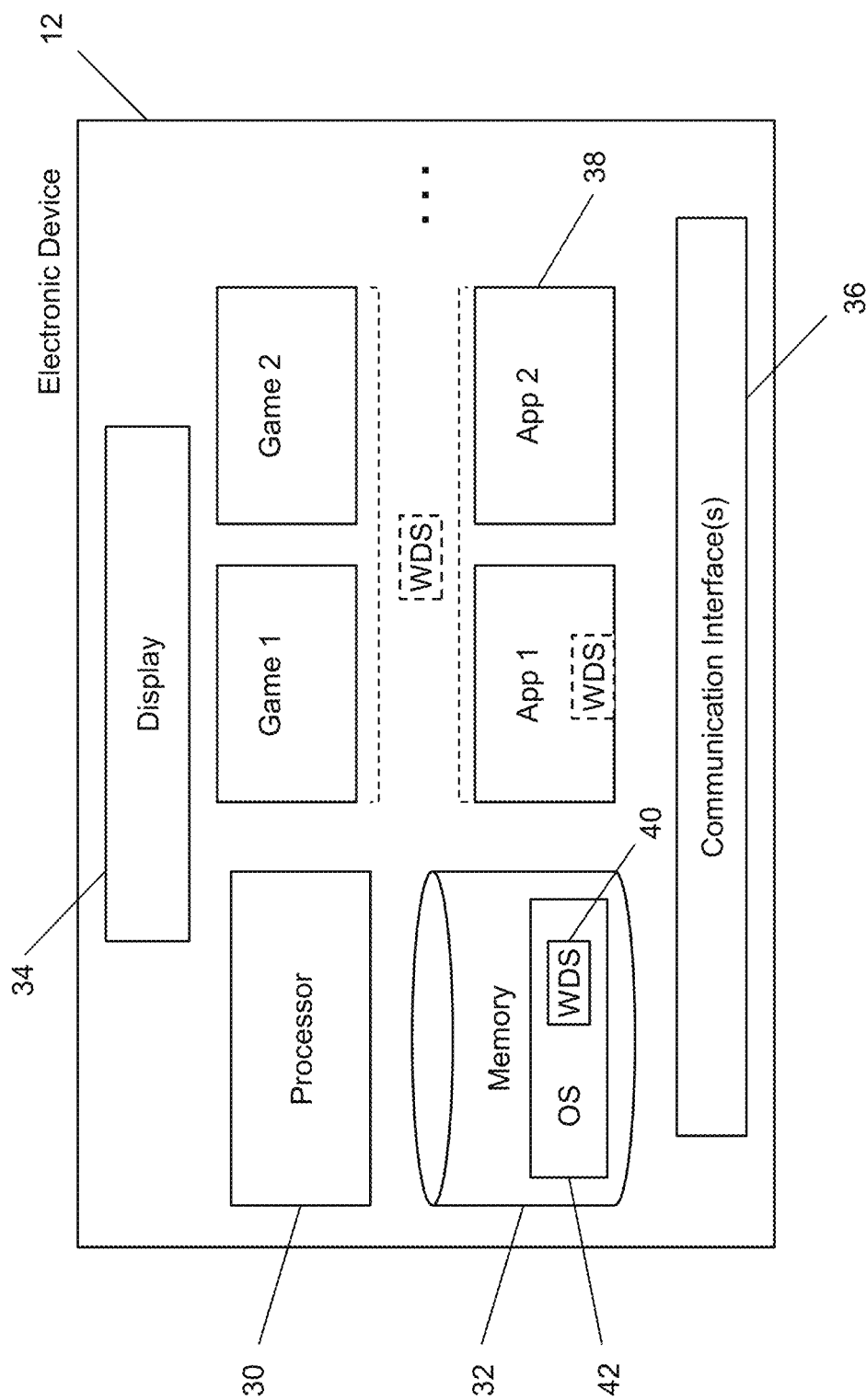
FIG. 2B is a block diagram of another configuration for a wireless device.

It can be appreciated that while in FIG. 2A each app 38 includes an embedded instance of the WDS 40 for monitoring and testing the app 38 and/or device 12, the WDS 40 can be deployed in various other configurations. For example, FIG. 2B illustrates that the WDS 40 can instead (or in addition to) reside in the OS 42 and centrally interact with a number of the apps 38. The WDS 40 may also reside as a stand-alone application or in another location or component of the device 12 as shown in dashed lines, with functionality to interact with a number of (or all) of the apps 38. Similarly, one or more of the apps 38 can additionally have the WDS 40 reside thereon (also shown in dashed lines), e.g., apps 38 that need to have such operations controlled internally rather than being opened up to an external program, module or routine. The WDS 40 can therefore be installed in several different apps (i.e. in a weather app and then a totally different game) and these different apps could potentially be installed on the same phone or a multitude of different phones. This allows for the scenario wherein the WDS 40 is installed several times on the same phone (e.g., as illustrated), in which case the WDS 40 should identify that it is getting data from the same device 12. It can be appreciated that the WDS 40 can have a hardcoded limit of a number of tests that can be performed over a time period, which limits are unalterable by the configuration server. The WDS 40 can also be operable to identify its own code running in a different application on a same electronic device, and be responsive to identifying its own code running in the different application by having only one instance of the wireless device software operating at the same time.

Figure 3:
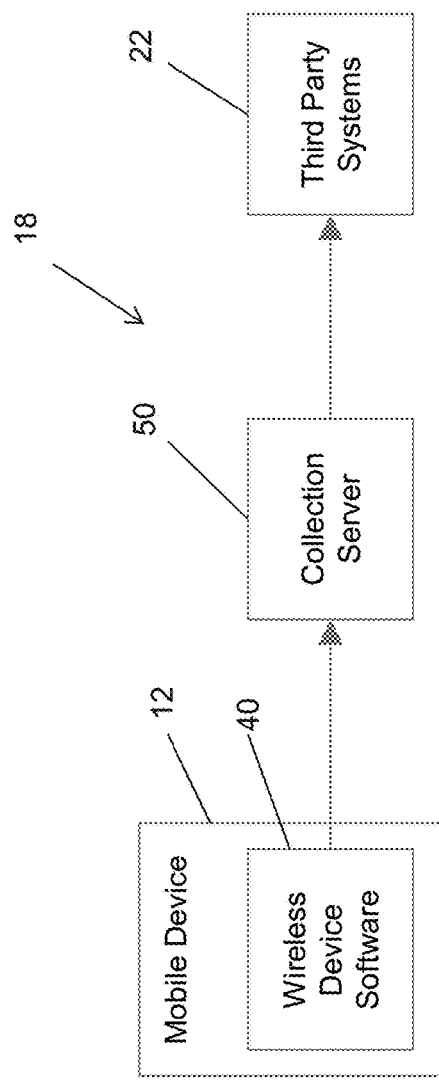
FIG. 3 is a block diagram of a configuration for collecting data from mobile devices using wireless device software (WDS)
Figure 4:
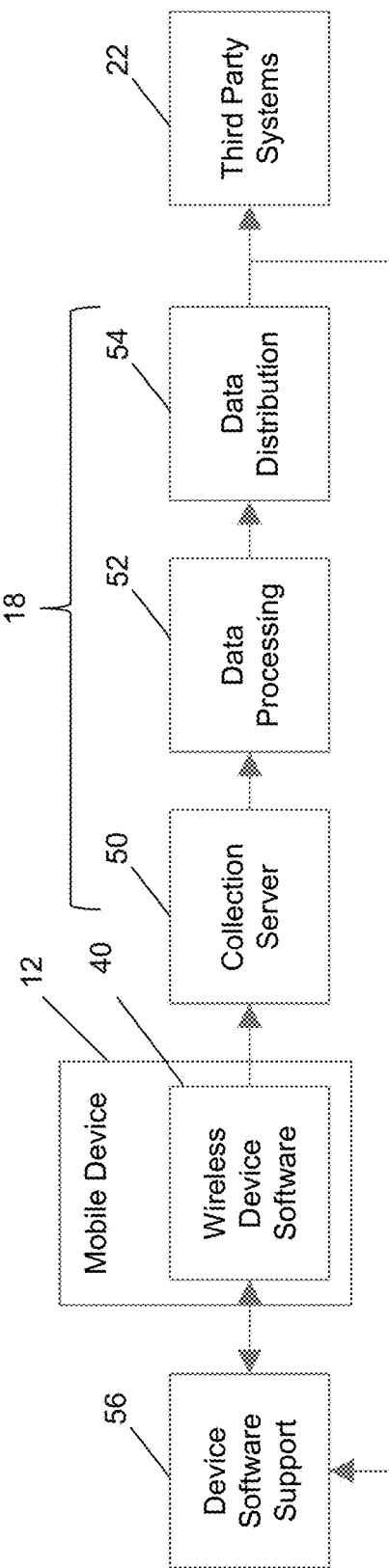
FIG. 4 is a block diagram of a configuration for collecting data from mobile devices using WDS with data processing, data distribution, and device software support.

A data collection configuration is shown at a high level in FIG. 3. Each mobile device 12 that is configured to operate the WDS 40 (using one or more apps 38) provides data to a collection server 50 that is deployed as part of the system 18. The collected data 16 is processed as herein described, along with data 16 obtained from other devices 12, to generate information and data for the third party systems 22. FIG. 4 provides further detail for the configuration shown in FIG. 3, in which the collection server 50 collects the data 16 and has the collected data processed by a data processing stage 52. The data thus processed is then provided to a data distribution stage 54 for distribution to the third party systems 22. FIG. 4 also illustrates that the data distribution stage 54 can enable the system 18 to provide feedback to the mobile device 12 by communicating with a device software support functionality 56 that is connectable to the WDS 40 to complete the feedback loop. The device software support functionality 56 can include the configuration server 24 shown generally in FIG. 1, as discussed in greater detail below.

By having the WDS 40 deployed in multiple different app types on multiple different device types operating with multiple different network types, not only can data be collected from a wider range of sources to provide a more meaningful and complete data set; a more comprehensive feedback network can be established thus providing the ability to reach a wider range of devices 12. Such a feedback network can be used for various purposes, including to modify the behaviour of the WDS 40. In addition to modifying the behaviour of the WDS 40, the feedback network can also be leveraged to create a two-way channel between the third parties 22 and the devices 12, apps 38, and even the networks 40 (e.g., network devices and infrastructure).

Figure 5:
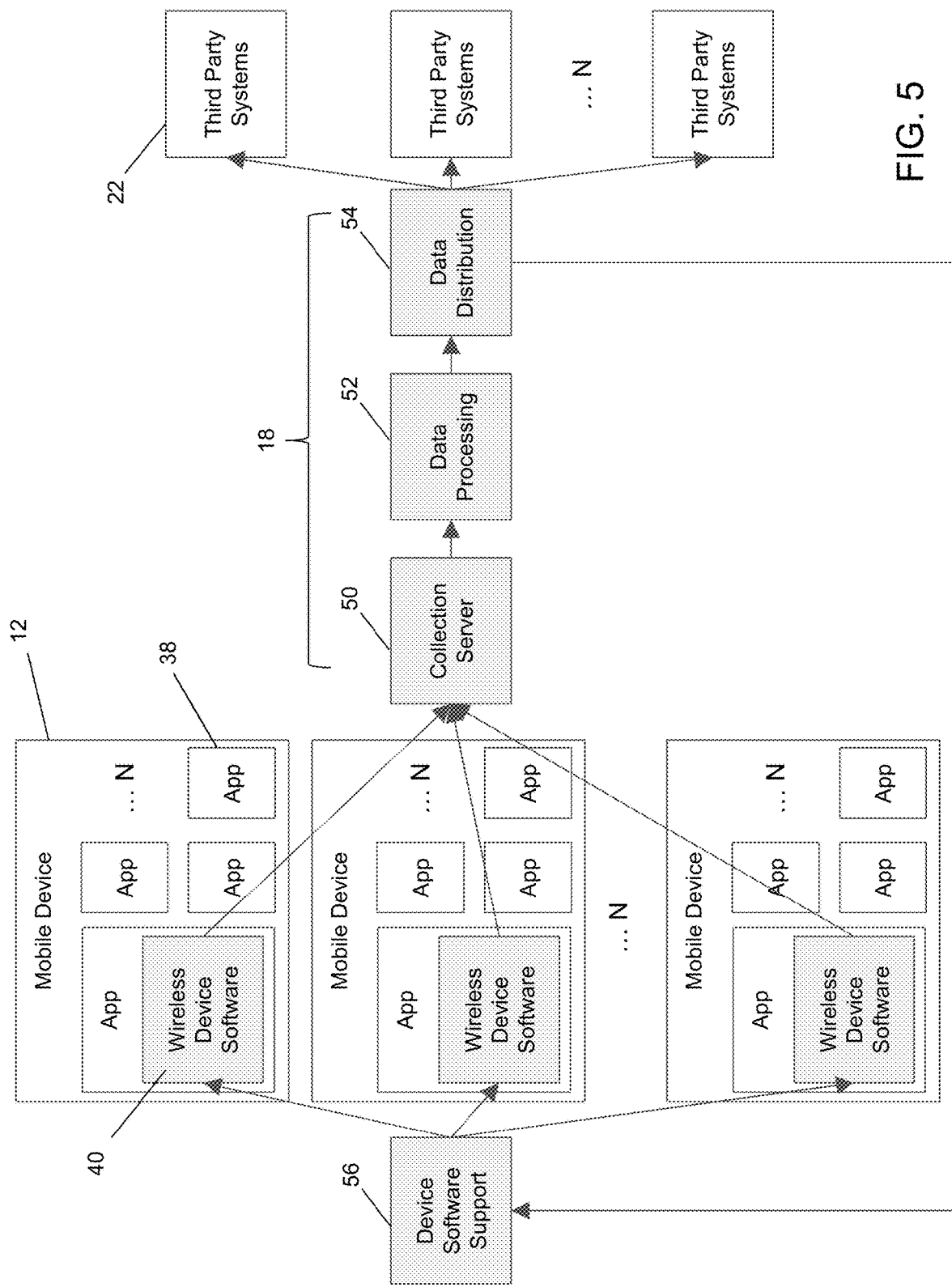
FIG. 5 is a block diagram illustrating the configuration shown in FIG. 4 for a plurality of devices and a plurality of third party systems.

FIG. 5 illustrates a configuration similar to that shown in FIG. 4, but showing the collection of data 16 from multiple devices 12 via multiple WDSs 40. As shown in FIG. 5, the plurality of mobile devices 12 shown can be served by a common device software support entity 56 and can provide data 16 to a common collection server 50. The system 18 may employ multiple regional collection servers 50 and device software support entities 56 as needed and thus the example shown in FIG. 5 is illustrative only.

Figure 6:
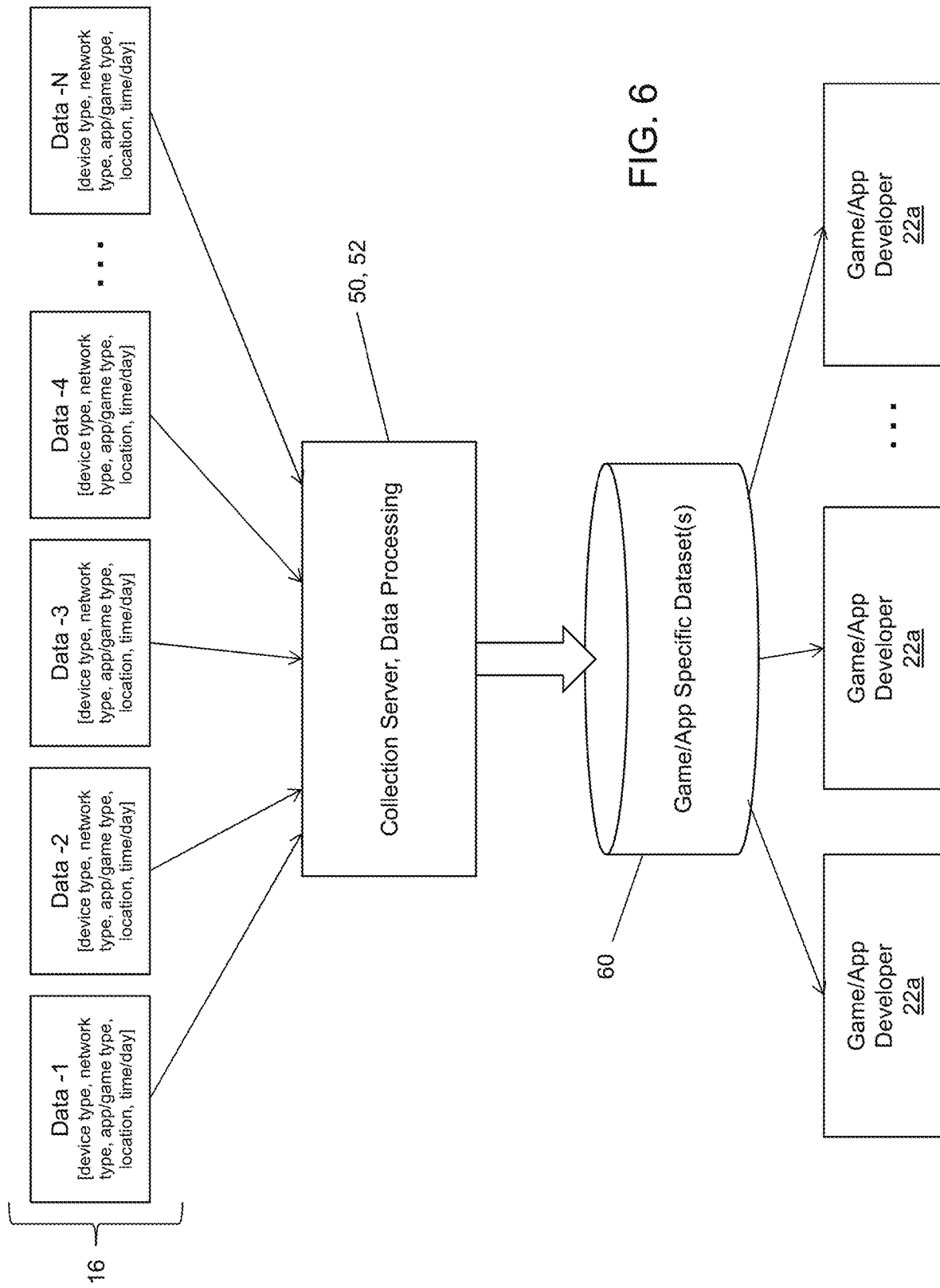
FIG. 6 is a schematic diagram illustrating a configuration for a collection server and data processing module to perform data aggregation from a plurality of devices.

On the data collection side, FIG. 6 illustrates operations that can be performed in the collection server and data processing stages 50, 52 to collect and aggregate the data 16 that is received from potentially a multitude of different types of sources. As illustrated in FIG. 6 since the data 16 originates from different apps 38 on different device types operating across different network types, while the data 16 may be collectively relevant, is not necessarily homogeneous. The collected data is therefore aggregated and can utilize rule set(s) or template(s) or other data structure(s) defining how to meaningfully aggregate the data for subsequent analysis by generating one or more game/app specific dataset(s) 60 that can be stored within the data processing stage 52 or elsewhere within or accessible to the system 18. The data processing stage 52 can also utilize any other $3^{rd}$ party metadata from third party data sources that are useful in aggregating and analyzing the data 16. This enables game- or app-relevant data 16 to be parsed or packaged for specific third parties 22.

For example, a particular game may be deployed on multiple different OSs, operating on various networks 14 and network types, in various geographical regions. The WDS 40 and the data collection mechanisms described herein enable data to be gathered that is relevant to that particular game, in order to inform the game developer 22a on performance and usage issues across a wide range of scenarios and environments. For instance, the game developer 22a can use the relevant collected data 16 to determine how the game performs in a cellular network 14 versus a WiFi network 14, when roaming versus on the home network, on one OS versus another OS, etc. Similar data packaging can be performed based on other criteria such as network, network type, device type, etc.

Figure 7:
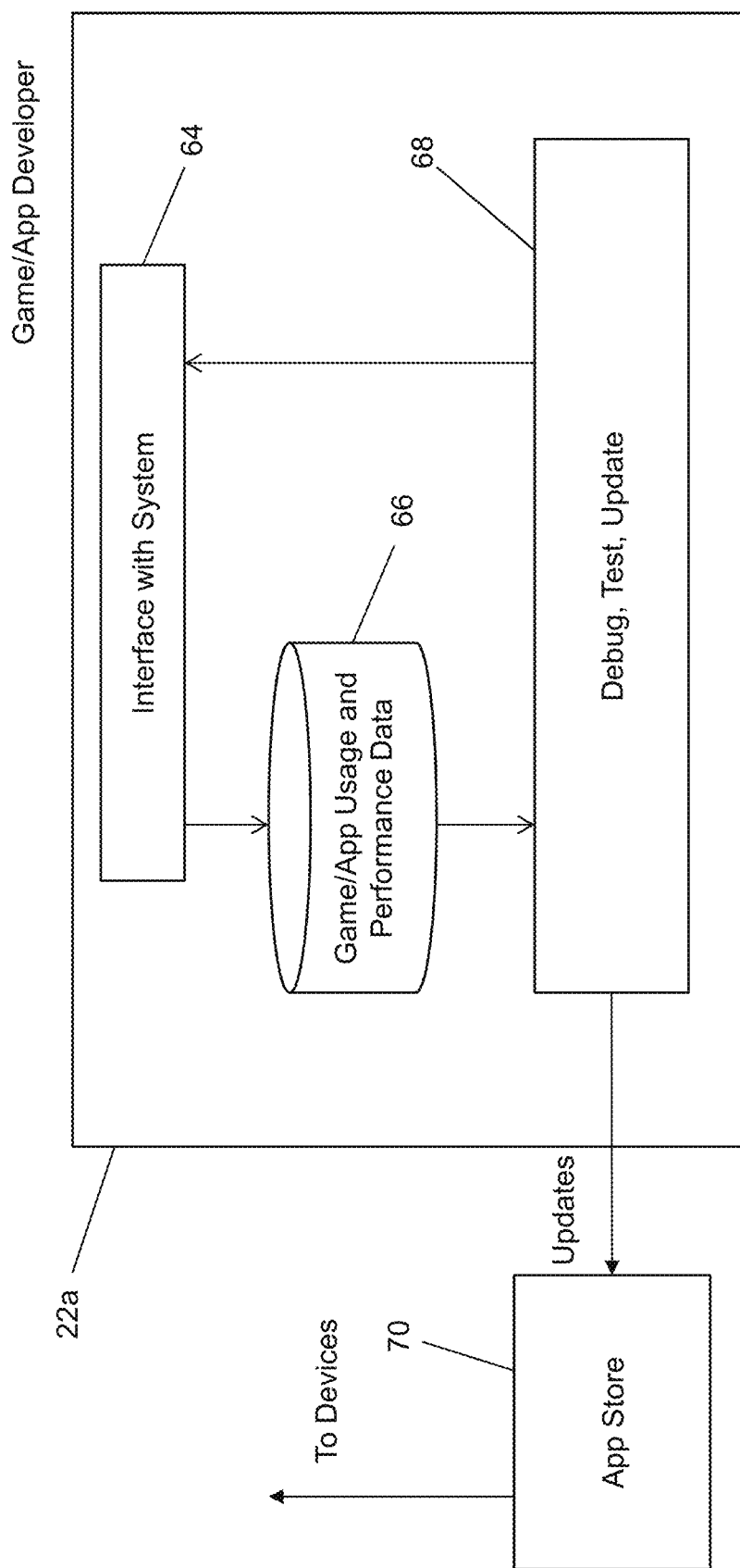
FIG. 7 is a schematic diagram illustrating a configuration for a game or application developer tool.

FIG. 7 illustrates a configuration that can be used by a game or app developer 22a to interact with the system 18. It can be appreciated that the configuration is meant to shown functionality that can be implemented using any computing device architecture and is not meant to be limiting in any way. In this example, the game/app developer 22a includes an interface 64 with the system 18, e.g., a network connection, dashboard, portal, web-based login, etc. The interface 64 enables the game/app developer 22a to obtain and store locally game/app-specific usage and performance data 66 obtained from the system 18. It can be appreciated that the data 66 can be obtained periodically in batches, via larger data downloads, uploads, transfers, etc., and can be updated according to any suitable data sharing implementation. The usage and performance data 66 is made available to one or more processing modules 68 that are used to debug, test, and/or update the game/app 38. For example, the game/app developer 22a may learn of a problem that users are experiencing with the app 38 and use the usage and performance data 66 to perform debugging and generate an update for the app 38. The data 16 collected by the system 18 is therefore leveraged in this example to adjust in-app actions and performance. The game/app developers 22a can rely on the normal usage and performance tests performed by the system 18, but can also have the system 18 perform tests in or for their particular app 38 in order to tailor the data collection process to that game/app developer 22a. The above-mentioned configuration server 24 can therefore be used to modify and continually adjust the behaviour of the WDS 40 or even communicate directly with other portions of the app 38 (discussed further below) in order to create the two-way channel for the game/app developer 22a. Moreover, this two-way channel can also be used to enable a system or sub-system to determine different code bases that are on or off in a particular device 12 and have the ability to turn them on/off as desired.

Also shown in FIG. 7 is an ability for updates generated by the game/app developer 22a, using the data 66 obtained from the system 18, to be deployed into other existing channels for modifying the behaviour of the apps 38, e.g., through an app store 70. In this way, the existing infrastructure can be relied on to complete the two-way channel. This also allows the system 18 to provide different levels of service and access to different game/app developers 22a.

With respect to the analysis of the data 66, in general there are two types of comparisons that can be made, namely 1) comparing from the entire crowd to a specific app 38, and 2) comparing differences in behaviour within a specific app 38. Additionally, the developer 22a may be looking for sharp swings in a given metric/value, or gradual changes over time as a user base evolves. Some non-exhaustive examples are provided below.

For 1), the developer 22a may be able to see app distributions across all apps vs a specific app in which the WDS 40 is embedded. Therefore, strong/sharp variances in device manufacturer+model+OS mix (mmo-mix) could indicate more than a demographic difference between those applications, but that there is a compatibility or performance issue with those particular manufacturer-model permutations.

Usage on mobile vs WiFi between apps can also be compared, and also potentially a data usage correlation. Other comparisons that can be made include patching rate and uptake across applications (i.e., how do users of different applications behave/treat updates for their app . . . can be an indicator of engagement, fatigue, etc.), and daily/weekly usage patterns between apps 38.

For 2), example analyses can include: changes over time to total device count, changes over time to mmo-mix, changes over time to regional distribution (e.g., could be blocked in certain country), changes over time to language distribution (e.g., could be incompatible with certain localizations), changes over time to screen resolutions (e.g., newer bigger devices and/or preferences for compatibility of users), changes over time to application version (i.e., how fast does userbase adopt various versions, which can also be important for planning WDS-releases by the system 18), looking for leading indicators for various changes to application population over time (e.g., perhaps users stop updating app 38 as frequently, which is a precursor to general disengagement & app usage dropping), differences in mmo-mix between regions, differences in device language across regions (expected, but can be important to validate the assumptions and look for unexpected cases), and differences in daily/weekly usage of app.

It can also be appreciated that the system 18 can similarly perform WDS optimization to account for differences in report-collected time vs uploaded time vs what was in the configuration, time for configuration uptake to spread to X % of deployed devices, or more generally, other correlations to validate expected configuration behaviour (e.g., testing at correct frequencies, with correct servers, etc.). WDS optimization can be determined by the system 18 itself analyzing any and all data 16 that is collected for multiple third parties 22 and/or can rely on feedback, input, and/or the results of analyses conducted by the third parties 22, e.g., for the examples described above.

Figure 8:
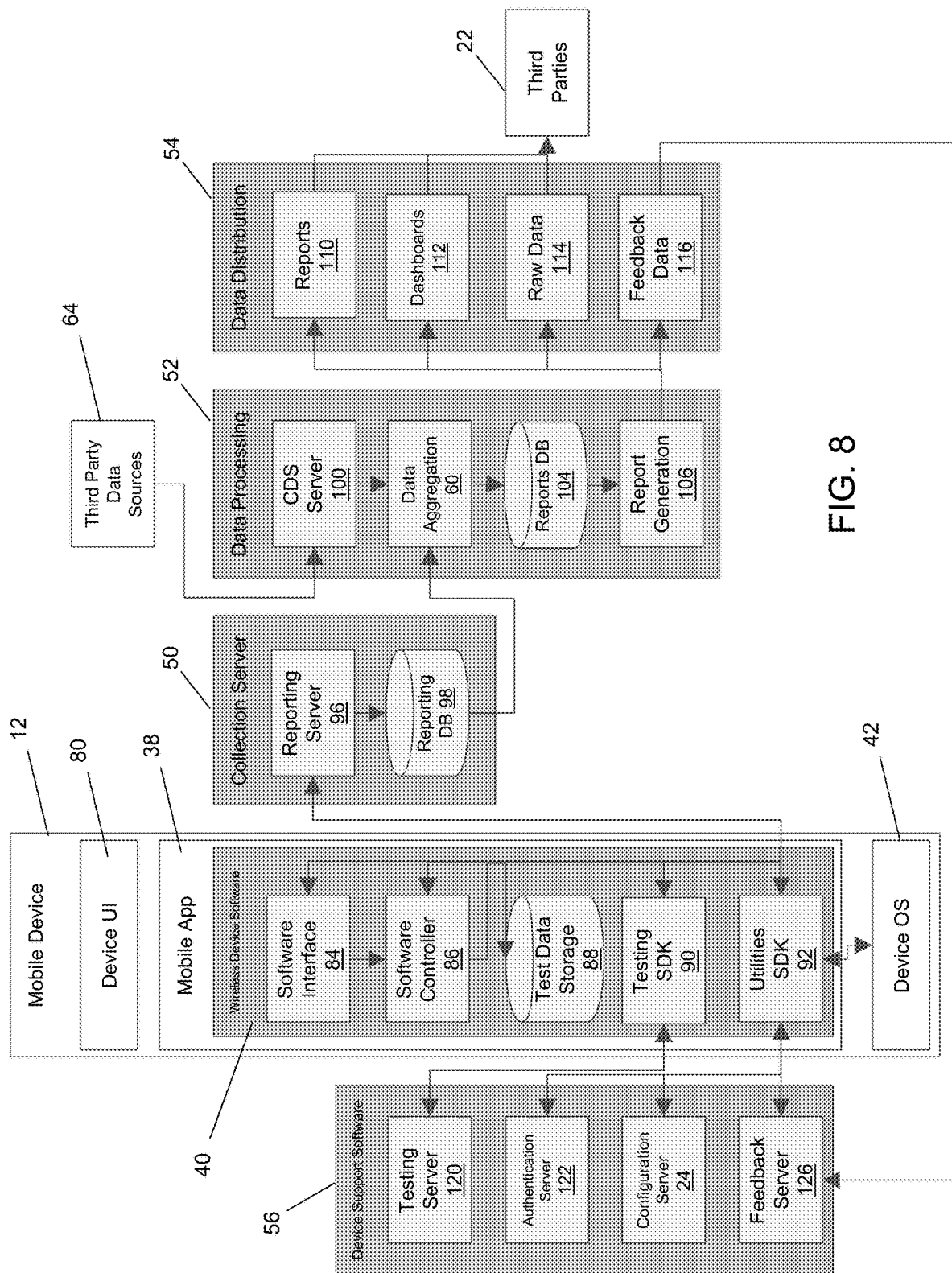
FIG. 8 is a block diagram illustrating additional detail for the configuration shown in FIG. 4.

Further detail concerning the functional blocks shown in FIGS. 4 and 5 is now provided in FIG. 8. Beginning with the mobile device 12, the WDS 40 in this example is embedded in a mobile app 38 and includes a software interface 84 for interfacing between the app 38 and a software controller 86 for controlling the tests and other operations of the WDS 40. The WDS 40 also includes a test data storage 88 for storing data acquired during the tests, a testing SDK 90 for performing one or more particular tests that involve operation of the app 38 and/or the device itself via the device OS 42. The WDS 40 also includes a utilities SDK 92 that includes methods, functions, and APIs that can be used to pull data and info from the device OS 42. Such methods can be used to export data to the collection server 50.

The SDK 92 is also operable to communicate with the collection server 50. The collection server 50 includes a reporting server 96 for receiving test and any other data being reported by the WDS 40, and a reporting database 98 for storing the test data for use by the data processing module 52.

The data processing module 52 includes a central data services (CDS) server 100 that provides data source APIs for different third party data sources and metadata. The CDS server 100 can also provide local storage for quick responses to the data aggregation operations. The CDS server 100 also interfaces externally with the one or more third party data sources 64 and internally with the data aggregation module 60 discussed above. The data aggregation module 60 obtains (i.e. pulls, requests or otherwise receives) the data collected by the collection server 50. The data aggregation module 60 also performs aggregation of the various data and data types and stores the aggregated data in a reports database 104 to be accessed by a report generation module 106 for generating various types of reports, dashboards, etc. It can be appreciated that data can also be pulled in from third party data sources and not only the collection server. For example external databases can be pulled in that help translate latitude and longitude into city names where the data was collected.

The report generation module 106 can generate various types of data for distribution to third parties 22 as shown in FIG. 8. For example, the report generation module 106 can generate reports 110 and/or dashboards 112, and can prepare raw data 114 to be analyzed elsewhere. The report generation module 106 can also prepare feedback data 116 to be sent to the device support software 56, in this example configuration, to a feedback server 126 that is part of such device support software 56.

The device support software 56 can include various servers that can communicate with and control, monitor, update, fix, kill, or otherwise interact with the WDS 40 in the various devices 12. In this example, the device support software 56 includes the feedback server 126 mentioned above, as well as a configuration server 124 for managing the configurations for the WDS 40, and an authentication server 122 for authenticating the WDS 40 to ensure that it is from an appropriate app and app developer. The device support software 56 also includes a testing server 120 for interacting with the testing SDK 90 for providing and updating/configuring tests and test sets to be performed by the WDS 40.

The WDS 40 can be configured as a software library that is embedded in the mobile device apps 38 in order to report and integrate with the collection server 50 and data processing module 52. The libraries of the WDS 40 can be added to an existing application to collect device, connection, network QoS, Wi-Fi, and application key performance indicators (KPIs). It can be appreciated that using this over the top approach only requires the WDS 40 to have the ability to communicate with the system 18 over an network connection, for example, either on Wi-Fi or mobile. This allows for the flexibility of deploying through a cloud infrastructure anywhere around the world. As shown in FIG. 8, the WDS 40 interacts with the device software support entity 56, which can include different servers with which the WDS 40 can communicate during its operation. The example configuration shown in FIG. 8 includes servers responsible for authentication and initiation (authentication server 122), configuration (configuration server 124), testing (testing server 120), and reporting (reporting server 96) that communicate with the WDS 40. The authentication server 122 can be used to dictate which application programming interface (API) keys and apps 38 are allowed to operate and collect data through the WDS 40. The configuration server 124 can be used to set specific rules and parameters for the operation of the WDS 40. The WDS 40 can also use testing servers 120 to perform active tests on the connected network 14. The reporting servers 96 are used to upload the data payloads from the WDS 40 to the system 18.

As indicated above, the authentication server 122 can be used to verify that applications 38 are using the correct API key for each developer, and to provision each app with a unique deployment key. Each application developer can be assigned an API key, which is used to generate a unique deployment key for each application 38. This deployment key is used to control the configuration of the WDS 40, as well as track the data collected by each application 38.

The authentication server 122 can also check that the app 38 has not been registered with the system 18 previously. This ensures that the data collected through the WDS 40 is associated back to the correct application 38 and developer, e.g., to account for revenue sharing. The authentication server 122 also allows the control of shutting down specific applications or developers from collecting data at any time, e.g. for implementing a "kill switch".

The WDS 40 can be configured to check with the authentication server 122 on first initialization of the WDS 40, and periodically (e.g., every few days) following initialization. This allows for the authentication server 122 to shut off any application 38 from collecting data 16. All communication and data transferred between the WDS 40 and the authentication server 122 is preferably secured and encrypted. For example, the WDS 40 can be given a three day local cache on the device 12 to prevent the WDS 40 from checking in with the authentication server 122 on every initialization to prevent extra traffic or chattiness over the network 14, and to act as a local cache on the device 12.

The testing servers 120 are used to perform active tests on a network 14 through interaction with the WDS 40. The testing servers 120 can host various files of different sizes for performing download throughput tests. For upload throughput tests, the testing servers 120 can provide an un-throttled bucket to upload files of any size. Furthermore, the testing servers 120 can also echo back packets for the corresponding communication protocol (e.g., UDP) packets sent from the WDS 40 for server response tests. Multiple testing servers 120 can be setup as necessary around the world. The testing servers 120 can be deployed on an cloud or on-premises hosting environment. The WDS 40 determines which server 120 to use for performing active tests by choosing the most appropriate server 120 based on the device's geographic location. For example, the closest route may require using undersea cable whereas a server slightly farther away may be able to make use of faster land-based cable (i.e. to account for more than just geographical proximity). The testing servers 120 used by the WDS 40 can be configured through the configuration server 124. All communication and data transferred between the WDS 40 and the testing servers 120 is preferably secured and encrypted.

The configuration server 124 is designed to allow full control over the WDS 40. The configuration server 124 allows the system 18 to adjust data collection frequencies, data reporting frequencies, and the types of data being collect for devices 12 out in the field. Each WDS deployment can be assigned a unique deployment key, used by the WDS 40 to periodically check what data collecting/reporting behaviors the WDS 40 should be adhering to. This allows the dynamic adjustment of the WDS 40 performance to fine tune battery consumption, network chattiness, and other parameters.

A configuration profile held by the configuration server 124 is downloaded to the WDS 40 upon the initialization of the WDS 40. For example, the configuration server 124 may hold a new policy that says "Do not collect data in Country X". That new policy, or that new profile for data collection, would be downloaded and executed by the WDS 40. A new configuration profile is pulled to the WDS 40 on a specified frequency. The WDS 40 can also have a local cache on the device 12 (e.g., three days), of the configuration server 124, to prevent the WDS 40 from pulling configurations from the configuration server 124 too frequently. All communications and data transferred between the WDS 40 and the configuration server 124 are preferably secured and encrypted.

The configuration file/data can be signed by the service with a known, trusted security certificate. The signature is passed down with the configuration server's configuration where it is verified in the WDS 40 on the device 12. The WDS 40 may then try to match the signature on the server configuration with one generated locally on the device 12 using the same certificate as the server side. If the signature generated on the WDS 40 does not match the one provided by the configuration server 124, the WDS 40 can be configured to reject the configuration and continue to use the previous configuration, or a default. This co-signing verification between the server 124 and WDS 40 ensures that the configuration is not compromised. Compromising the configuration supplied to the WDS 40 can have varying degrees of impact on the user device, the amount of data used, the battery impact, etc.

With the configuration shown in FIG. 8, the following process flow can be implemented. The WDS 40 can initialize by checking with the authentication server 122 to run or not. The WDS 40 then pulls a configuration file from the configuration server 124 to direct the operation of the WDS 40. Data is then collected by the WDS 40 by interacting with the device OS to capture various KPIs about the device, network connection, network QoS, WiFi scan information, and application data usage, etc. as discussed herein. The WDS 40 can also perform network performance tests against the testing server(s) 120.

Data is collected by the WDS 40 and stored in an database (e.g., SQLite) over a particular time period, e.g., a 24 hour period. The database is then exported to the reporting server(s) 96. The reporting servers 96 can parse through the database to split the data into different tables, e.g., within BigQuery. In this example, the data is stored in various BigQuery reporting tables depending on the type of data. On a periodic basis, e.g., hourly, dataflow jobs can be run to add additional metadata to the raw data uploaded from the WDS 40. This metadata includes tagging the raw data with country, region, and city metadata, etc. Once the data is processed by the dataflow jobs, data is made available in various tables and views. These tables and views allow raw data export or building visualizations and standard reports with other tools as herein described. It can be appreciated that standard reports, custom reports, customer dashboards, and raw data can all be made available through a combination of custom reports and dashboards or through different views and exports from the tables (e.g., from BigQuery).

Figure 9:
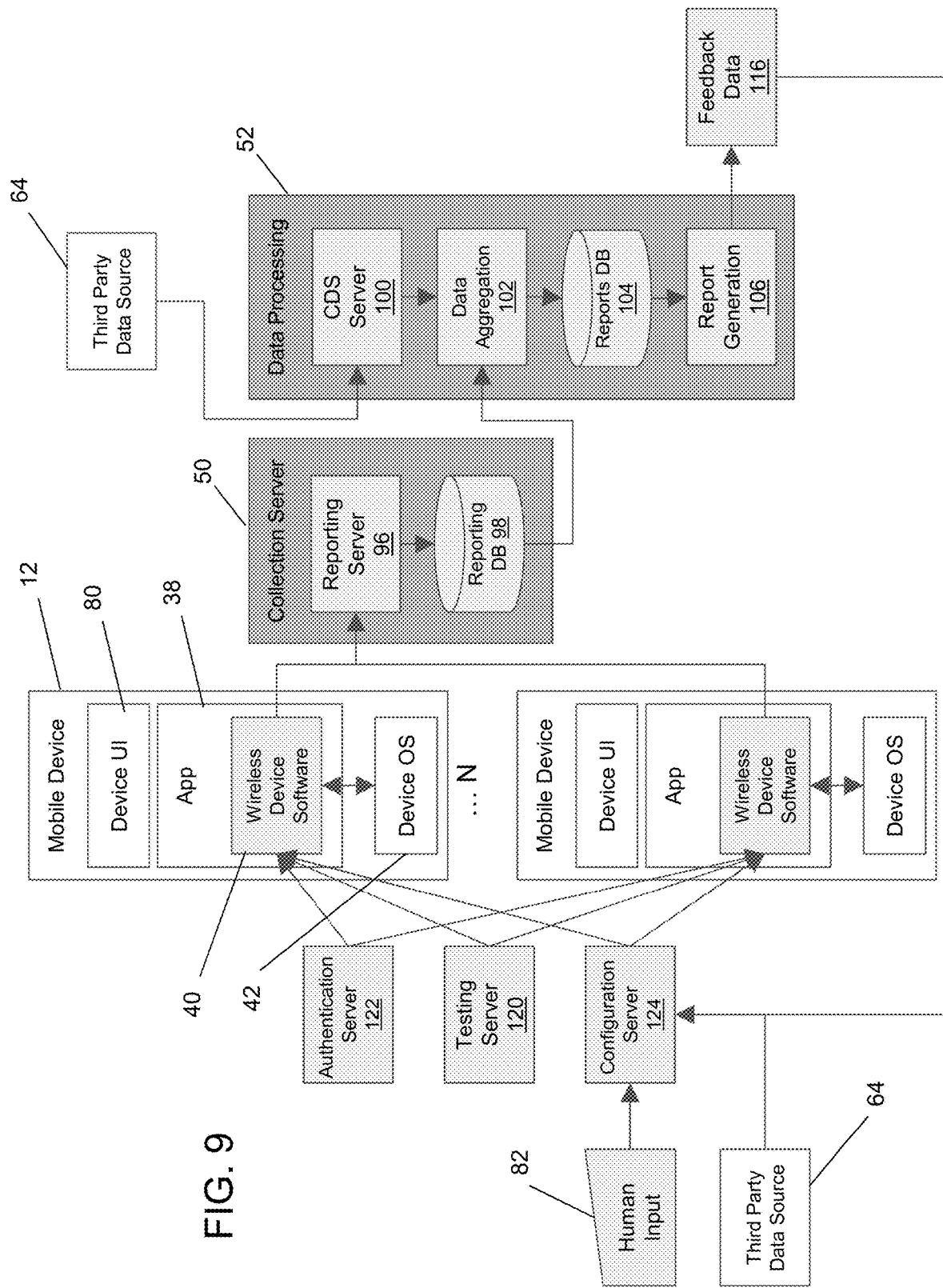
FIG. 9 is a block diagram illustrating a configuration in which feedback and configuration servers are used to communicate and/or control apps using wireless device software in a plurality of mobile devices.

As illustrated in FIG. 9, the collection server 50 is configured to collect data from multiple mobile devices 12 by having the reporting server 96 interfaced or otherwise in communication with the WDS 40 in each of the multiple devices 12. It can be appreciated that while the collection server 50 can communicate with multiple devices 12, the wider system can include multiple collection servers 50, e.g., regionally placed, each collection server 50 being capable of communicating with the data processing module 52. FIG. 9 also illustrates that the feedback data 116 generated by the report generation module 106 can be provided to the configuration server 124 in order to create the two-way channel between the WDS 40/apps 38/devices 12 and the third parties 22, via the system 18.

The configuration server 124 can also utilize third party data sources 64 and human input 82 in order to control operation of the WDS 40 on any one or more of the devices 12. The third party data sources 64 and human input 82 can be provided by any party authorized to control the configuration server 124 for a particular purpose. For example, a game/app developer 22a can access feedback data 116 in the form of usage and performance data 66 (see FIG. 6) and apply human input 82 directly to the configuration server 124 for modifying the behaviour of their app 38 (using the WDS 40 or other functionality). The third party data sources 64 can be related to that game/app developer 22a or may be a separate source 64 relied upon by the game/app developer 22a, e.g., location-based data, etc.

Figure 10:
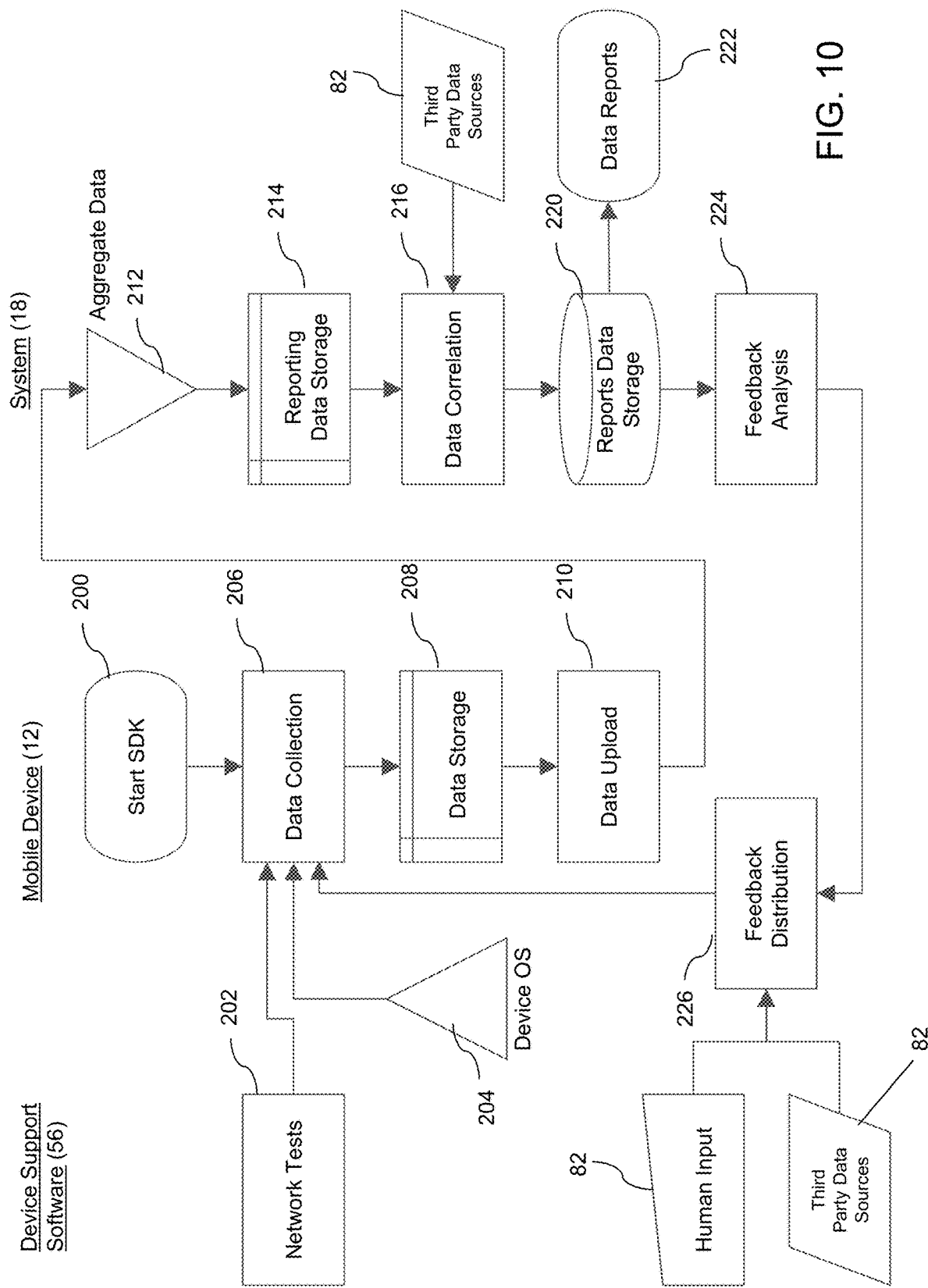
FIG. 10 is a flow chart illustrating computer executable instructions performed in controlling the collection of data and/or controlling operation of apps on a plurality of devices.

FIG. 10 illustrates data flow in gathering, aggregating, and analyzing data from mobile devices 12 for utilizing the two-way channel shown in FIG. 9. At step 200 the mobile application (or operating system, etc.) that contains the WDS 40 initiates the WDS 40 to begin collecting test data collection on the mobile device 12 at step 206. It can be appreciated that as shown in FIG. 2, the OS 42 or other components of the device 12 can be used to initiate the WDS 40 to begin the data collection. The data collection at step 206 is performed based on network tests performed in connection with the device support software 56 at step 202 and by communicating with the device OS 42 at step 204. Additionally, as shown in FIG. 9, the data collection performed at step 206 can be influenced by feedback distribution data or operations at step 226, which is itself controlled or influenced by the third party data sources 82, human input 82, and feedback analysis step 224.

The collected data is stored at step 208 and uploaded to the system 18 at step 210. The uploaded data is collected and aggregated at step 212 and stored at step 214 in the reporting data storage as noted above. The aggregated data can be correlated in various ways at step 216 by referencing third party data sources 82 in order to generate and store reports data at 220. This enables the various data reports to be provided to the third parties 22 at step 222.

The data can be aggregated at step 212 by adding the uploaded data to a large set of tables, e.g., split by day. The large set of tables can then be queried according to certain variables. In one configuration, data for all apps 38, devices 12 and networks 14 can be placed in the same data storage, and can be grouped in various ways depending on what is meant to be shown in the reports, dashboards, etc.

The data is analyzed in various ways, by the system 18 and/or the third parties 22. For example, the data 16 can be broken down by country, region, city, etc.; as well as by time periods (e.g., month). Custom groupings can also be performed by network type (2G vs 3G vs 4G) and statistics determined and displayed for those groupings. Custom groupings can also be performed to determine application package names, application names. It can be appreciated that determining application package names is non non-trivial since a single application can have multiple packages as part of its installation, and also different names in different languages. The system 18 is configured to coalesce the packages to obtain a single-language list of app names and their associated package names (since package names are globally unique). Custom groupings can also be prepared for service providers based on mobile country codes (MCCs) and mobile network codes (MNCs). This allows brands to be matched up with operators for a given network 14, rather than relying solely on the network 14 reported by the device 12 (e.g., since there may exist a roaming situation or other scenario where the provider listed by devices 12 may be inconsistent).

The system 18 can therefore combine the uploaded data from a multitude of different mobile applications 38 and deployments from a multitude of devices in various networks, regions, etc. The system 18 is also able to obtain data 16 that is specific and relevant to particular game/app developers 22a, network operators, device manufacturers, etc., by parsing or packaging this comprehensive data set accordingly. The system 18 is also able to pull additional metadata 64 from several other third-parties and open data sources 82. The system 18 can output raw data files as well as make data available for visualizations through user interfaces (e.g., dashboards).

For example, a set of the dataflow jobs can be used to add additional metadata to the raw data being uploaded from the WDS 40. These dataflow jobs can be performed periodically, e.g., hourly on the last hour of data upload from the WDS 40. The results can then be grouped into daily tables at a particular time, e.g., GMT midnight, for querying.

The following is a summary of the processes that can take place throughout the dataflow jobs:

1. For many fields, enumerators can be used in the WDS 40 for simplicity and for reducing the amount of data uploaded. The dataflow jobs can be used to swap out the enumerations for human-readable strings.

2. Country, region, and city tags can be added to the data based on the reported latitude and longitude.

3. The geohash can be calculated for the reported latitude and longitude.

4. The device storage remaining and device memory remaining can be calculated.

5. Mapping from MCC and MNC to a service provider branding can be added.

6. Mapping from an application package name to application name can also be added.

It can be appreciated that several open and paid third party sources can be used to complement the raw data collected by the WDS 40.

The data reports generated at step 222 can therefore be constructed in various ways and, if desired, additional third party data sources 82 can be incorporated. Since the data is collected from a multitude of WDSs 40 deployed within various types of applications running on various types of OSs 42 and device types; all within, crossing between and/or interacting with various network types 14 and regions; a more comprehensive view of how a network, device, application, operating system or electronic environment more generally can be assessed. The data that is collected and stored can be queried in many ways for many purposes to suit the needs of different third parties 22 wanting access to such a wider and more complete set of data. Since the WDS 40 can be deployed within various types of apps 38, such as games that enjoy substantial circulation and reach across multiple platforms, regions, an unobtrusive tool is deployed and can be leveraged gather such desired data on a periodic and ongoing basis without adversely affecting the performance of the devices 12 or apps 38.

Figure 12:
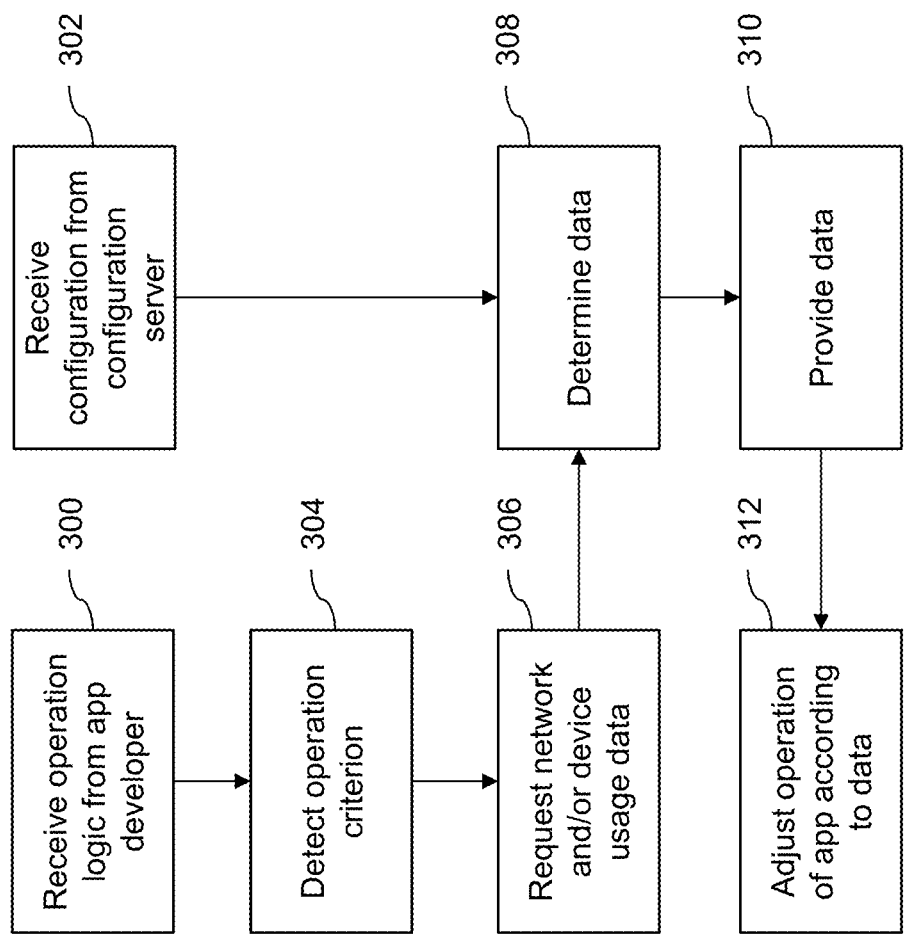
FIG. 12 is flow chart illustrating computer executable instructions performed in controlling operation of an app using an app operation logic module.
Figure 11:
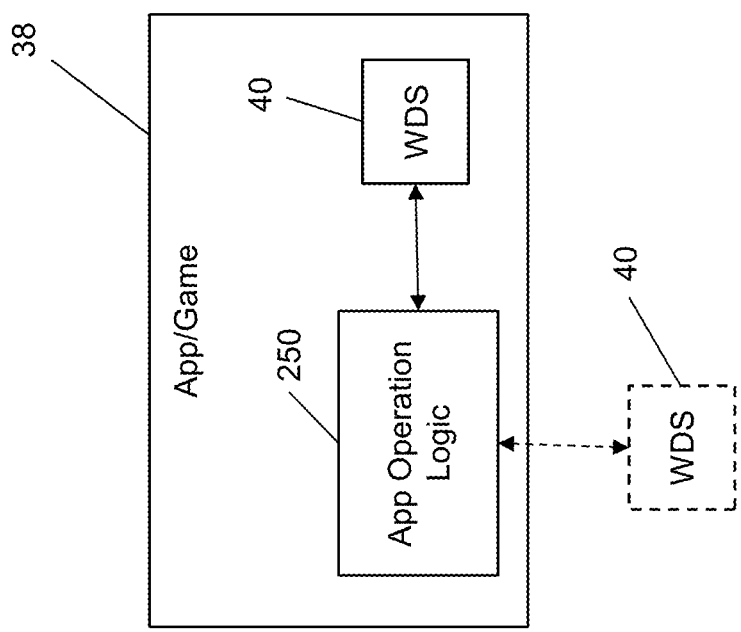
FIG. 11 is a block diagram illustrating an app operation logic module for communicating with a WDS for controlling operation of the app.

As indicated above, the third parties 22 can use the two-way channel enabled by the system 18 to not only affect the behaviour of the WDS 40 that is running in or with their app 38, but also to modify the behaviour of the apps 38 themselves. FIG. 11 illustrates an implementation wherein a particular app/game 38 includes both the WDS 40 and other app operation logic 250 that coordinates with the WDS 40 to rely on data collected locally by the WDS 40 to change behaviour in real-time or at least periodically without necessarily requiring a formal update to the app 38. For example, as shown in FIG. 12, the app/game 38 can receive or be programmed with (e.g., via an app store update) the operation logic 250 from the game/app developer 22a at step 300 (or this step can be performed at the time of programming the app 38). Similarly, the WDS 40 which is embedded in the app 38 or is otherwise coupled to the app/game 38 receives a configuration from the configuration server 24 at step 302. While the configuration server 24 and WDS 40 can perform various tests as herein described, the WDS 40 can also coordinate with the operation logic 250 in the app 38 for other purposes. At step 304 the operation logic 250 detects an operation criterion such as a location or time event, and requests network and/or device usage data from the WDS at step 306. This could include triggering a specific test or obtaining testing data that would have been previously gathered by the WDS 40. For instance, when the app/game 38 detects that it has changed from operating on a WiFi network 14 to a cellular network 14, it can request performance data from the WDS 40 for the particular cellular network 14 being used, which can be determined by the WDS 40 at step 308 and provided back to the operation logic 250 at step 310. This allows the operation logic 250 to adjust operation of the game/app 38 at step 312 according to the data provided by the WDS 40. In an example provided above, this would allow the game/app 38 to control when to deliver ads or what type of media to use based on the performance of the current network 14 in which the game/app 38 is being used.

In addition to providing a system and method that makes crowdsourced data gathered from a multitude of wireless electronic devices available to application developers and/or other third parties such as network operators or device manufacturers to improve application, device and/or network performance as described above; various other applications, configurations, and use cases making use of or configuring the underlying system 18 will now be described.

User Informed Testing

The system 18 described above contemplates testing networks 14 and generating test data in a few different ways, namely:

a) Requesting the mobile device OS 42 for information (i.e. device API calls).

b) Creating network traffic and running "active tests". For example, determining the throughput of a network by downloading a file from a controlled testing server 120 then watching the performance of that owned and controlled download. In this case, the network traffic being analyzed was created for the express purpose of performing a test.

c) Watching network traffic initiated by the user or some other mobile device service that has not been generated for the specific purpose of performing a test, i.e., a "passive test". For example, a network testing service can examine how quickly a user is able to upload a photo on Facebook or download a YouTube video, and then determine throughput by passively watching the performance of those non-controlled operations.

It is recognized that access to more user information makes it possible to enhance these three types of tests. For example, the actions, behaviours, or locations of the users (or mobile services) could dictate which of the three types of tests to perform. These same actions, behaviours, or locations could also provide additional information which can inform the approach to testing or how the results should be interpreted to generate more valuable and accurate insights.

Traditionally, passive testing has been found to be less accurate than active testing. This is because less is known about the traffic being analyzed, that is, passive testing is less controlled. The system 18 described herein can be configured to perform network tests that are either initiated by user actions, or informed by user actions. This can be done by being given, or otherwise having access to, additional user or mobile service information, which can greatly enhance passive testing (and testing in general). This is because mobile apps 38 can track user actions such as the user clicking a button to upload a photo. When the mobile app 38 sees that a user has clicked the button "upload photo", it can run a passive network test on that data upload while knowing: 1) It was a photo; 2) the size of the photo being uploaded; and 3) the destination server address. In other words, the mobile app 38 and WDS 40 are in a position to leverage an increased understanding of the nature of the file transfer to perform a more effective and accurate passive throughput test. This can be done, for example, by having the WDS 40 utilize an API to ingest information from the mobile app 38. In this way, the mobile app 38 passes information to the WDS 40, such as "the user just clicked a button to upload a photo of size x". Accessing this information provides context that may not have previously been available for passive testing, for instance when a file has been uploaded, not knowing that it was a photo, the resolution or size of the photo, or the destination server and routing details.

The system 18 can therefore be adapted such that the user's interaction with a mobile service would dictate what type of passive network test to perform and how to interpret the results. For example, if the user uploads a photo on a particular mobile service such as Instagram, the system 18 can use that additional information to perform a passive network test that is designed to monitor the network's ability to handle photo uploads. This additional information can be provided by a mobile application 38 and is typically provided by the mobile application 38 which contains the network testing code—however other sources for that additional information are possible. In this event, the system's passive test would have access to additional information such as: 1) that the user is trying to upload a photo; 2) the size of that photo; and 3) the destination sever, etc.

It can be appreciated that user informed testing does not need to be limited to passive network tests. The mobile user's behaviour, characteristics, location, etc. could dictate specific active tests which should be run based on the types of tests desired by the controller of the system. User informed testing also allows the system to consider when an active test or a passive test would be most appropriate. For example, it may be best to only run passive tests, which don't create more new network traffic, when the user is watching a video or doing something with their device 12 which is sensitive to network performance. In other words this "additional information" and user informed testing can help dictate when and where tests should be performed to: 1) not interfere with user experience, or 2) provide the information which is most needed by the system.

Furthermore, as wireless networks move more and more towards being virtualized or software defined, the user informed test results can be used to modify or dictate the hardware, software or implementation of the network 14 itself by informing the network's requirements based on the services and applications 38 being used by users and the actions they take.

The system 18 described herein can therefore be used to perform user informed/dictated testing, that is, where the user does not specifically choose to run a network test. In this case, network tests are selected and initiated based on the actions performed by a user of a mobile device 12 which contains the network testing software (e.g., downloading a photo). The details of those actions performed by the user can be used as an input into the analysis of the results (e.g., a network's ability to serve a photo). The action performed by the user is something that is not the user choosing to run a network test.

It can be appreciated that while the above examples are in the context of knowing more about a user, and the in-app buttons such a user would select, it could equally be a non-human service that provides the additional information.

Device Churn Tracking & Advertising

The above-described systems and methods contemplate tracking mobile devices 12 as they access and make user of wireless networks 14. These mobile devices 12 and their users can be identified and tracked on a day-to-day basis in various ways, including:

a) The mobile device ID: For example MAC Address, IMEI, or IMSI of the mobile device.

b) The advertising ID of the device: Advertiser ID or IDFA are non-persistent ID's of the mobile device 12 used to serve targeted mobile advertisements.

c) Cookies: IDs that are installed on devices as they access and use networks and network services.

d) The mobile software ID (or WDS ID): A unique ID generated by mobile device software to identify a specific installation of the software.

e) An ID used to log-in to mobile software: For example, a Facebook ID, Netflix ID or Gmail ID that is used by a user to log-in to a mobile application 38.

f) A set of behaviour characteristics: For example, a set of characteristics, which may be defined based on a number of factors which may include locations of the device, IP addresses used by the device, or WiFi/Cellular access points generally used by the user.

Each device tracking approach has its own privacy implications which typically needs to be considered and managed. That is, a selected tracking approach would normally need to be both acceptable to the mobile device user and certain legal requirements.

By tracking how these IDs flow through networks 14, the system 18 may be used to inform wireless service providers about user churn. For example, if an application ID is used to log-in on a phone on a first network 14a one day, and then later the same application ID is used to log-in on a phone on a second network 14b, then it can be reported that this user likely churned. That is, in this case it can be expected that this user left the first network 14a and became a customer on the second network 14b. Such churn reporting on its own provides a valuable service to wireless providers. However, this reporting becomes even more powerful when combined with other data sets to enable predictive capabilities which create the possibility of advertising to influence churn.

For example, this historical network churn information when combined with other information sets such as wireless network coverage, wireless network performance, website cookies, recent searches, mobile device hardware/software, user network subscription plans, what people are saying about the wireless network operator on social media, and other information sets, can be used to perform churn prediction on individual users or on large aggregate portions of the population.

This enables enhanced targeted advertising by wireless operators to users who are either: 1) high probability candidates to leave their network 14; or 2) high probability candidates to leave their competitor's networks 14. The same mobile IDs can be used to target specific users or IDs with appropriate advertisements.

As an example, the system's wireless network performance tests can be used to compare networks and inform targeted advertising campaigns. If the second network provider discovers that they are the best wireless network in a specific city they could adjust their advertising to devices in that city to promote their network as being the highest performer. It is then possible for mobile applications 38 and services to suggest wireless operators to their users. Users may opt-in to allow a wireless service, such as Facebook, to track network performance, their usage patterns, and location and then suggest to them the best wireless network 14 for their requirements.

As an alternative approach to tracking user churn, the system 18 may track which groupings of mobile devices 12 tend to show up on specific networks 14. For example, if the same four mobile devices consistently access the same WiFi access point, or access networks via the same IP address, it is reasonable to assume that this is a family unit or associated group. If suddenly one of those devices 12 leaves that grouping and a new device 12 appears which is authenticated with a different cellular wireless network 14 it can be reasonably assumed that there has been a network churn event by the user of that newly appearing device.

As such, tracking one or more IDs associated with a user or device 12, and obtaining access to or otherwise tracking user-related events such as social media posts, can enhance churn identification and churn reporting and/or targeted advertising. The system 18 can be adapted for such churn prediction by tracking a user as they move across networks 14 and across mobile devices 12 using their social media log-in IDs, such that an analysis of network/device churn can be performed.

Net Neutrality and Service Level Agreement Tracking

Wireless network performance tracking by the system 18, which can be performed by crowdsourcing from mobile end points as described above, can also be used to determine which areas, users, or services are being throttled; as well as which areas, users or services are being provided with enhanced levels of service.

Identifying and comparing low performance and high performance cases can be used in a variety of ways, for example:

a) To inform cities and governments on which areas are being properly served by wireless service providers. Wireless regulators often require that carriers provide certain levels of service to rural areas and/or less privileged neighborhoods, and violators can be identified and penalized using the testing data.

b) To inform Mobile Virtual Network Operators (MVNOs) on whether or not a home network is providing adequate levels of service or if the home network operator is providing inferior service to the MVNO's subscribers compared to their own. This allows the MVNO to determine if their home operator is in violation service level agreement (SLA) rules.

c) To inform wireless networks 14 on which network 14 they should have their subscribers roam to and whether or not those roaming networks 14 are adhering to or violating SLAs and how the roaming quality experience by their roaming subscribers compares to the quality being received by that network home subscribers.

d) Whether or not net neutrality laws are being adhered to or violated. For example, it can be seen if a network operator is throttling a third party streaming service, and promoting their own streaming service, and to what extent.

The system 18 can therefore be adapted such that the network test results or service quality is compared against a threshold of quality dictated by a wireless regulator or home network provider to see if requirements are met.

Event Driven Testing—Self-Driving Vehicles/Cyber-Physical

Network quality and coverage is often considered critical to certain emerging cyber-physical domains such as self-driving vehicles and ehealth. In these cases, the end mobile device 12 has a core purpose, which is network sensitive. It is important that these devices 12 maintain access to network quality that is good enough to meet their core purpose requirements. For example, an ehealth device designed to inform hospitals of heart attacks should be able to send a message to hospitals or emergency dispatchers when a heart attack is detected.

Network testing capabilities for these devices 12 may then be considered critical to their performance, with test being triggered by events which are inherent to the device's core purpose.

In one example, a self-driving vehicle or vehicle network may choose to run tests whenever vehicles need to perform emergency maneuvers (e.g., avoid an animal or other obstruction on the road) to track the performance of these maneuvers. Alternatively, the vehicle grouping may run tests only in cases when it is known that there are portions of the road or route where network performance information is lacking. In these cases a network testing system can have its tests triggered by external events. The resulting network dataset can be combined with information about the cyber-physical device's operation and requirements to determine if the network 14 is adequate for that cyber-physical device's requirements.

In another example, an e-health device 12 may perform event driven tests on the network 14 to ensure that the network 14 is performing well enough to handle the network requirements of an emergency situation (and that the devices is connected to the appropriate server). Example events in this case may be: 1) User is sleeping or user is in nor immediate health danger; 2) User health reading are reaching dangerous levels which could get worse; 3) User is in danger.

It can be appreciated that in applications such as self-driving vehicles the devices 12 are in a great position to map network quality across huge areas and therefore may be relied upon or otherwise play an increased role in future network testing. It can also be appreciated that vehicles are not just limited to automobiles, and may include drones or other autonomous devices.

Privacy in Mobile Device Testing

The mobile devices 12 used to perform network testing typically need to have the ability to preserve user privacy to degrees that are informed by the user themselves. For example, if a user inputs that they either opt-in or opt-out of the service, or portions of the service, the overall system should be responsive to that input and adjust what is collected accordingly. The analysis and handling of that data should also be informed by those same user inputs.

The system 18 can also be adapted to ensure that it is capable of consuming information about the jurisdictional and geographic difference in privacy rules and be responsive to those rules. For example, a global testing system may perform differently in Russia than in the European Union depending on the current governing privacy legislation in both areas.

It can also be important that the system 18 orchestrate the tests performed amongst the full network of testing end points to preserve privacy of users. For example, the system 18 may choose to distribute the tests amongst the mobile devices 12 in such a way that makes it even more difficult to track the movement or characteristics of a specific device 12. Or, for example, if a specific area is known to be private property and have a very low population density, the system 18 can be configured to be able to handle that data differently, or not collect data from that area, since it would be easier than normal to associate the tests taken in that low-population area with the person or persons known to live in or access that area. There may also be specific geographic areas in which it becomes illegal to run tests or measure location, and the system 18 may need to be adapted accordingly.

MIMO/SON—Interference Suppression and Beam Forming

Multi-input Multi-output (MIMO) and SON systems 22b may have a multiplicity of channels available, each of which is evaluated. Also, MIMO and SON systems 22b can use beamforming to broadcast specific channels and network resources to specific mobile devices 12, namely based on their unique requirements. As a result each user in the network 14 can be experiencing something completely different such that the importance of crowdsourcing network quality increases.

Information crowdsourced from the mobile devices 12 themselves can ultimately be used to inform the network 14 about the network characteristics which are required to be broadcasted to each mobile device 12 and how this beamforming needs to take place (generally based on the application being used or subscription tier of the user). As the waveforming and beamforming takes place, the mobile device's application and network experience information (crowdsourced via the system 18) can be used in a feedback loop to inform the waveforming and beamforming processes.

In other words, beamforming allows every user to get access to different network characteristics. However in order to understand if this is working well, there needs to be a feedback loop informed by network crowdsourcing as herein described.

Security

Abnormal Mobile Device Behavior: The network testing/monitoring agent (e.g. the WDS 40) can be used to detect/identify compromised mobile devices 12. For example, if the WDS 40 normally sees that a mobile device 12, or an IoT device 12, normally only uses 2 MB/day of data, and then that suddenly jumps to 100 MB, the system 18 can be used to identify this abnormal network behaviour and flag the device 12 as possibility being compromised.

Abnormal Access Point Behavior: It is recognized that adversaries are beginning to use rogue access points and fake cell towers to lure mobile devices 12 into connecting. They can then monitor the traffic over the network 14 or use these malicious connections to install malware. The system 18 can also be used to identify abnormal access point behaviours. For example, if users are accessing the same access point from various locations, then that access point may be a rogue access point which is being driven around luring connections. Alternatively, if the cell tower ID, or some other identifier of a cell tower, or a cell tower's characteristics suddenly change, it can be flagged as possibly being a false tower made to appear similar to the non-malicious access point.

The system 18 can therefore be adapted such that the performance and details of mobile devices 12 and network access points are compared against the expected details/performance to search for network issues and compromised systems.

Leaking of Private Network: Certain networks are not intended to be seen outside of specific geographic areas and certain facilities. The system 18 can report if certain networks 14 are seen where they should not be seen.

Additional features which can make the system 18 more secure include:

a) The network of mobile devices 12 can be controlled by several network controllers instead of just one (i.e. system fragmentation). For example, the mobile devices 12 can use a different configuration server 24. It can be appreciated that there may also be benefits in fragmentation, which would require subset populations of devices 12 to use all different servers (i.e. different testing servers 120, different authentication servers 122, and different configuration servers 24). This way if one of the controllers is compromised then the whole system 18 is not compromised at once. In the scope of the above principles, the network controllers are generally used to control which devices 12 run which tests and under what conditions. The network controllers are also used to control which servers are used for those tests. If those servers are compromised, then the entire system could be used to run a DDOS attack.

b) The mobile device agents (e.g., WDS 40) which perform the tests can be setup so that they re-authenticate every so often or they otherwise go dormant. This characteristic can be hardcoded into the WDS 40 so that if the WDS 40 becomes compromised (e.g., to run a DDOS attack) then after a certain period of time the WDS 40 shuts off because it stops being able to re-authenticate.

Example Use Cases

Application Monitoring:

The network tests described above can be used to report the performance or likely performance of network applications 38 such as Skype, YouTube, Netflix, etc. without ever interacting directly with the proprietary servers used by those applications. Instead, the network requirements of those applications 38 are understood and compared against the network characteristics being observed and collected by the network testing agent (e.g., WDS 40) in order to report on application performance. The system 18 can therefore be configured such that the results are used to report the performance or likely performance of network applications 38.

Network Operations:

The above-described crowdsourcing can provide alarms to network operators indicating specific areas or network access points which are providing less than optimal performance. These alarms and this information can be used to inform network maintenance or indicate which areas of a network 14 require additional testing by other methods. The system 18 can therefore be configured such that the performance and details of mobile devices 12 and network access points are compared against the expected details/performance to search for network issues and compromised systems.

Network Planning:

The system 18 can pinpoint areas with large foot traffic or population densities that are also underserved by wireless service providers. These are the areas where network improvements are expected to provide the largest gains to the overall subscriber base. By comparing this performance to that of competitors, the system 18 can suggest areas where the network operator should focus to be more competitive and perform better customer acquisition. The system 18 can therefore be configured such that the results are used in conjunction with user density information collected from the system 18 or external sources to inform a network operator on the most beneficial location for network maintenance, expansions, and upgrades.

Competitor Tracking:

The system 18 can be used to inform a network operator on: 1) what new towers or technologies are being implemented by competitors; 2) which network operators are gaining the most subscribers and where; 3) what types of applications/services the competitive network are running and how that is changing over time; and 4) the performance of competitive networks and how that is evolving over time. The system 18 can therefore be configured such that the results are used to inform a wireless operator on the performance being delivered by their competitors to their competitor's subscribers and in which the new network implementation/alternations of competitors are recorded, predicted, and reported.

Connection Management Platform Interaction

Furthermore, the system 18 can also be configured to interact with a device connection management platform (not shown), as my be provided by a mobile phone operating system, or as may be controlled by the network operator, to help a mobile device 12 select an appropriate network 14 or access point connection. In this case the data collected by the WDS 40 is transmitted, either in its raw form or after an analysis of the data, to the connection management platform via an API for use in the network or access point selection process.

Artificial Intelligence and Machine Learning

Furthermore, the system can also benefit from the use of Artificial Intelligence (AI) and Machine Learning (ML) in addition to data analysis. Data reported by the WDS 40 may be input to AI and ML platforms (not shown) for processing into enhanced information to be used by network operators for purposes such as network planning, network maintenance, customer care, customer advertising, and operators. In addition, this enhanced information may be input to SON, software defined network (SDN), network function virtualization (NFV), or MIMO systems such that the network 14 can be responsive to this enhanced information produced by AI and ML processes run on the data supplied by the WDS 40. Groups other than network operators may similarly benefit from the enhanced information produced by AI and ML applied to the WDS test data.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 18, any component of or related to the system 18, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of controlling testing behaviour of a system that evaluates wireless device performance, and/or wireless network performance, and/or wireless network usage trends, the method comprising:
   providing wireless device software to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with characteristics and/or location of the device, and/or performance of the device and/or the network, and/or usage of the device by a user;
   receiving via one or more collection servers, test data obtained by the wireless device software from each of the plurality of wireless electronic devices;
   providing a data set to a third party, the data set comprising at least some of the test data; and
   controlling a configuration server in communication with the wireless device software to have the configuration server modify the testing behaviour of the wireless device software to modify effects of the at least one test on the plurality of wireless electronic devices, based at least in part on the data set provided to the third party that comprises the test data.

2. The method of claim 1, wherein the configuration server is controlled by the system that evaluates wireless device and/or wireless network performance and/or network usage trends.

3. The method of claim 2, wherein the system receives a request to modify the testing behaviour from the third party.

4. The method of claim 1, wherein the configuration server is controlled by the third party.

5. The method of claim 4, further comprising registering the third party with the system to provide authorization to interact with the configuration server.

6. The method of claim 1, wherein the wireless device software communicates with an external testing server for testing quality of a wireless network.

7. The method of claim 1, wherein the wireless device software communicates with the configuration server to obtain configuration data for performing the at least one test.

8. The method of claim 7, further comprising using the configuration server to control a frequency of testing and/or when and where tests are performed, including an ability to cease further testing by a particular application or device.

9. The method of claim 1, further comprising providing an authentication server for registering the wireless device software and approving use of the wireless device software within the electronic device.

10. The method of claim 1, wherein the third party comprises one of an equipment manufacturer, a game or application developer, a self-organizing network (SON), or a wireless network operator.

11. The method of claim 1, further comprising preparing a plurality of data sets each being specific to a corresponding application, network, or device; wherein the system is configured to selectively control groups of wireless device software based on requests from respective third parties.

12. The method of claim 1, further comprising obtaining metadata from at least one third party data source, and incorporating the metadata into the data set to be provided to the third party.

13. The method of claim 1, wherein the configuration server is used to terminate operation of the first application.

14. A method of controlling testing behaviour for an application by a third party, the method comprising:
   receiving a data set from a system that evaluates wireless device and/or wireless network performance and/or network usage trends, the data set comprising test data associated with a first application, the test data having been obtained by the wireless device software from each of the plurality of wireless electronic devices, the wireless device software having been provided to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with performance of the device and/or the network and/or usage of the device by a user;
   analyzing the data set to determine at least one operation for modifying the testing behaviour of the wireless device software to modify effects of the at least one test on the plurality of wireless electronic devices; and
   having the at least one operation applied to the wireless device software.

15. The method of claim 14, wherein the at least one operation is applied as an update provided via a separate channel.

16. The method of claim 15, wherein the separate channel comprises an app store associated with deployment of the first application.

17. The method of claim 14, wherein the at least one operation is applied using a configuration server in communication with the wireless device software and which is configured to be controlled to modify the testing behaviour of the wireless device software based at least in part on the data set provided to the third party associated with the first application.

18. The method of claim 14, further comprising providing operation logic in the first application to be in communication with the wireless device software to modify operation of the first application at least in part according to the test data or future test data.

19. The method of claim 14, wherein the third party comprises one of an equipment manufacturer, a game or application developer, and a wireless network operator.

20. The method of claim 14, wherein the at least one instruction comprises an instruction to terminate operation of the first application.

21. The method of claim 14, wherein the first application is related to operation of the device or is associated with a network operator, and wherein the at least one instruction affects operation of functionality on the device and/or operation of the device in a network.

22. A non-transitory computer readable medium comprising computer executable instructions for controlling testing behaviour of a system that evaluates wireless device performance, and/or wireless network performance, and/or wireless network usage trends, comprising instructions for:
providing wireless device software to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with characteristics and/or location of the device, and/or performance of the device and/or the network, and/or usage of the device by a user;
receiving via one or more collection servers, test data obtained by the wireless device software from each of the plurality of wireless electronic devices;
providing a data set to a third party, the data set comprising at least some of the test data; and
controlling a configuration server in communication with the wireless device software to have the configuration server modify the testing behaviour of the wireless device software to modify effects of the at least one test on the plurality of wireless electronic devices, based at least in part on the data set provided to the third party that comprises the test data.

23. A system comprising a processor and memory, the memory comprising computer executable instructions for controlling testing behaviour of a system that evaluates wireless device performance, and/or wireless network performance, and/or wireless network usage trends, comprising instructions for:
providing wireless device software to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with characteristics and/or location of the device, and/or performance of the device and/or the network, and/or usage of the device by a user;
receiving via one or more collection servers, test data obtained by the wireless device software from each of the plurality of wireless electronic devices;
providing a data set to a third party, the data set comprising at least some of the test data; and
controlling a configuration server in communication with the wireless device software to have the configuration server modify the testing behaviour of the wireless device software to modify effects of the at least one test on the plurality of wireless electronic devices, based at least in part on the data set provided to the third party that comprises the test data.

24. A system comprising a processor and memory, the memory comprising computer executable instructions for controlling testing behaviour for an application by a third party, comprising instructions for:
receiving a data set from a system that evaluates wireless device and/or wireless network performance and/or network usage trends, the data set comprising test data associated with a first application, the test data having been obtained by the wireless device software from each of the plurality of wireless electronic devices, the wireless device software having been provided to each of a plurality of wireless electronic devices connected to one or more of a plurality of networks by having the wireless device software embedded in at least one application or memory of the corresponding electronic device, wherein the wireless device software is embedded in or operable with a plurality of types of applications and performs at least one test associated with performance of the device and/or the network and/or usage of the device by a user;
analyzing the data set to determine at least one operation for modifying the testing behaviour of the wireless device software to modify effects of the at least one test on the plurality of wireless electronic devices; and
having the at least one operation applied to the wireless device software.

* * * * *